(12) United States Patent
Coston et al.

(10) Patent No.: US 11,014,582 B2
(45) Date of Patent: May 25, 2021

(54) SYSTEM AND METHOD FOR RECONFIGURING AN AUTORACK

(71) Applicant: Trinity Rail Group, LLC, Dallas, TX (US)

(72) Inventors: Kyle R. Coston, Forney, TX (US); Gary V. Turner, Lawrenceville, GA (US); David W. Higginbotham, Cartersville, GA (US); Robert J. DeGroot, Keller, TX (US)

(73) Assignee: TRINITY RAIL GROUP, LLC, Dallas, TX (US)

( * ) Notice: Subject to any disclaimer, the term of this patent is extended or adjusted under 35 U.S.C. 154(b) by 148 days.

(21) Appl. No.: 16/166,879

(22) Filed: Oct. 22, 2018

(65) Prior Publication Data
US 2019/0144010 A1 May 16, 2019

Related U.S. Application Data

(60) Provisional application No. 62/585,358, filed on Nov. 13, 2017.

(51) Int. Cl.
*B61D 3/04* (2006.01)
*B61D 3/18* (2006.01)
(Continued)

(52) U.S. Cl.
CPC ............. *B61D 3/04* (2013.01); *B60P 3/07* (2013.01); *B60P 3/14* (2013.01); *B60S 5/00* (2013.01);
(Continued)

(58) Field of Classification Search
CPC .......... B61D 3/16; B61D 3/181; B61D 3/182; B61D 17/046; B61D 17/10; B61D 3/04;
(Continued)

(56) References Cited

U.S. PATENT DOCUMENTS 4,730,562 A * 3/1988 Baker ..................... B61D 3/02
105/407
4,913,061 A 4/1990 Youngblood
(Continued)

FOREIGN PATENT DOCUMENTS

FR 1503791 A 12/1967
WO 2014144477 A1 9/2014

OTHER PUBLICATIONS

International Search Report and Written Opinion for PCT Patent Application No. PCT/US2018/059824, dated Jul. 1, 2019; 23 pages.
(Continued)

*Primary Examiner* — Lawrence Averick
(74) *Attorney, Agent, or Firm* — Baker Botts, LLP

(57) ABSTRACT

A method comprises removing a first deck of a plurality of decks and a second deck of the plurality of decks from an autorack. The method further comprises removing one or more of a plurality of posts of the autorack and coupling a cross-brace assembly to one or more of the plurality of posts, wherein the cross-brace assembly is coupled to the one or more of the plurality of posts at a location above an existing brace bay of the autorack. The method also comprises coupling the second deck of the plurality of decks to the autorack at a location above or below the cross-brace assembly.

10 Claims, 24 Drawing Sheets

(51) Int. Cl.
  *B60P 3/07* (2006.01)
  *B60P 3/14* (2006.01)
  *B60S 5/00* (2006.01)
  *B61D 3/00* (2006.01)
  *B61D 3/02* (2006.01)
  *B60P 3/08* (2006.01)

(52) U.S. Cl.
  CPC ............ *B61D 3/005* (2013.01); *B61D 3/02* (2013.01); *B61D 3/18* (2013.01); *B61D 3/187* (2013.01); *B60P 3/08* (2013.01)

(58) Field of Classification Search
  CPC ... B61D 3/18; B61D 49/00; B60P 3/07; B60P 3/06
  See application file for complete search history.

(56) References Cited

U.S. PATENT DOCUMENTS

| | | | | |
|---|---|---|---|---|
| 5,622,115 | A | * | 4/1997 | Ehrlich ............... B61D 3/04 105/215.1 |
| 6,287,061 | B1 | | 9/2001 | Tinnell |
| 2009/0090268 | A1 | | 4/2009 | Early |
| 2012/0024188 | A1 | | 2/2012 | Budnick |
| 2016/0039432 | A1 | | 2/2016 | Cencer et al. |
| 2017/0217448 | A1 | | 8/2017 | Huck et al. |
| 2017/0217449 | A1 | | 8/2017 | Huck et al. |
| 2017/0217451 | A1 | | 8/2017 | Huck et al. |
| 2017/0217452 | A1 | | 8/2017 | Huck et al. |
| 2017/0334462 | A1 | | 11/2017 | Richmond et al. |

OTHER PUBLICATIONS

International Search Report and Written Opinion for PCT Patent Application No. PCT/ US2018/059807, dated Feb. 15, 2019; 15 pages.

Partial International Search Report for PCT Patent Application No. PCT/US2018/059824, dated Mar. 15, 2019; 16 pages.

International Preliminary Report on Patentability, Patent Application No. PCT/ US2018/059824, dated May 19, 2020.

Notification Concerning Transmittal of Intl. Preliminary Report, Patent Application No. PCT/ US2018/059824, dated May 28, 2020.

* cited by examiner

SYSTEM AND METHOD FOR RECONFIGURING AN AUTORACK

CROSS-REFERENCE TO RELATED APPLICATION

This application claims priority to U.S. Provisional Patent Application No. 62/585,358, entitled "Systems and Methods for Reconfiguring an Autorack" which was filed on Nov. 13, 2017, the entire contents of which are incorporated by reference herein

TECHNICAL FIELD

The present disclosure relates generally to autoracks, and more particularly to a system and method for reconfiguring an autorack.

BACKGROUND

Automobile manufacturers often transport vehicles via railroad lines on multi-deck railcars, such as autoracks. In general, autorack railcars are comprised of two components: a flat railcar and a rack. The rack may be a uni-level autorack, a bi-level autorack, a tri-level autorack, or a convertible autorack (e.g., a rack that may be configured as a uni-level, bi-level, and/or tri-level autorack). Racks typically have a condition-based life of usage. In contrast, flatcars have a limited age of usage based upon AAR standards. As a result, a flatcar of an autorack may age out and have to be replaced before the rack needs to be replaced. And any replacement of the flatcar or other components of the autorack may necessitate recertification of the autorack.

Moreover, when consumer demand for certain types and/or sizes of vehicles changes, so too does the demand for certain types of autoracks. Such changes frequently cause shortages in supply of one type of autorack and force autorack operators to invest in new equipment to meet demand and place out-of-demand equipment in storage. While railcar manufacturers developed convertible autorack railcars in response to the negative impacts of these changes in market demand, many non-convertible autoracks still exist in the industry.

SUMMARY

The teachings of the present disclosure relate to a system and method for reconfiguring an autorack. In accordance with one embodiment, a method for reconfiguring an autorack includes removing a first deck of a plurality of decks and a second deck of the plurality of decks from an autorack. The method further includes coupling a cross-brace assembly to two or more of the plurality of posts, wherein the cross-brace assembly is coupled to the two or more of the plurality of posts at a location above an existing brace bay of the autorack. The method also includes coupling the second deck of the plurality of decks to the autorack at a location above or below the cross-brace assembly.

In accordance with another embodiment, a method includes removing a first deck of a plurality of decks from an autorack, wherein the autorack is an existing autorack. The method further includes coupling at least one pulley to the autorack, coupling at least one cable to the at least one pulley, coupling at least one actuator to the autorack, and coupling a controller to the autorack, wherein the controller is electronically coupled to the at least one actuator. The method also includes coupling the first deck of the plurality of decks to the autorack and the at least one cable. The at least one actuator is operable to pull the at least one cable to adjust a vertical position of the first deck within the autorack.

In accordance with another embodiment, a method includes removing a roof section from an autorack and removing one or more of a plurality of existing side screens from the autorack. The method further includes coupling one or more of a plurality of replacement side screens to a side of the autorack, the one or more of the plurality of replacement side screens configured to extend in a vertical direction. The method also includes coupling at least one pulley to the autorack, coupling at least one cable to the at least one pulley, coupling at least one actuator to the autorack, and coupling a controller to the autorack, wherein the controller is electronically coupled to the at least one actuator. In addition, the method includes coupling the roof section to the autorack at a location above the one or more of the plurality of replacement side screens. The actuator is operable to pull the at least one cable to adjust a vertical position of the roof section.

In accordance with yet another embodiment, a method includes removing an existing roof section from an autorack, removing one or more of a plurality of existing side screens from the autorack, and removing one or more of a plurality of existing decks from the autorack. The method further includes increasing a width of a first end portion of a flatcar of the autorack such that the width of the first end portion of the flatcar is greater than a width of a center portion of the flatcar, increasing a width of a second end portion of the flatcar of the autorack such that the width of the second end portion of the flatcar is greater than the width of a center portion of the flatcar, increasing a width between a first post of a plurality of posts and a second post of a plurality of posts, the first post located near a first side of the first end portion of the flatcar and the second post located near a second side of the first end portion opposite the first side of the first end portion, and increasing a width between a third post of the plurality of posts and a fourth post of the plurality of posts, the third post located near a first side of the second end portion of the flatcar and the fourth post located near a second side of the second end portion opposite the first side of the second end portion. The method also includes coupling one or more of a plurality of replacement decks to the autorack, coupling one or more of a plurality of replacement side screens to one or more of the plurality of posts, and coupling a replacement roof section to the autorack.

Technical advantages of particular embodiments may include a system and method for reconfiguring an autorack that allows the current design of an autorack to be reconfigured to accommodate existing market demand (thereby preventing the autorack from being taken out of service), to extend the life of the autorack, and/or to extend the useful life of the autorack when the flatcar it is installed on requires replacement.

Another technical advantage of particular embodiments may include reconfiguring a tri-level autorack into a bi-level autorack (and vice versa) as part of an autorack recertification process, which may be significantly more economical than reconfiguring the tri-level autorack into a bi-level autorack (and vice versa) earlier in the autorack's lifetime.

Another technical advantage of particular embodiments may include reconfiguring an existing tri-level autorack, a bi-level autorack, or an articulated bi-level autorack into a convertible autorack, an autorack with varying width, an autorack with automatic adjustable decks, and/or an autorack with an adjustable roof height. Similarly, a convertible autorack may be reconfigured into an autorack with varying width, an autorack with automatic adjustable decks, and/or an autorack with an adjustable roof height.

A further technical advantage of particular embodiments may include securing a cross-brace assembly to an autorack above an existing tri-level brace bay, rather than removing the tri-level brace bay and replacing it with a bi-level brace bay. By securing the cross-brace assembly onto and above existing autorack structures, the time and cost of transforming an existing tri-level autorack into a bi-level or convertible autorack and recertifying an autorack may be reduced.

An additional technical advantage of particular embodiments may include replacing an existing door structure of an autorack, for example, with a seal safe radial door structure, thereby reducing the risk of theft, damage, and vandalism of vehicles being transported on the autorack.

Yet another technical advantage of particular embodiments may be having the splice of the replacement deck in the middle of the railcar, such that differences in the length of the railcar due to manufacturing tolerances or by design can be accommodated more easily. In addition, by splitting a deck into two halves, usually at the middle of the railcar, and using a shim plate to cover the space between the two deck halves, it may be easier to remove the deck and more of the deck may be preserved during removal, thereby reducing the cost of a rebuild and/or conversion.

A further technical advantage of particular embodiments may include leaving post pairs 5 and 6 (and other posts) attached to an autorack during the reconfiguration process, which may reduce replacement cost and facilitate realignment of a replacement deck.

Another technical advantage may include an autorack having a variable width that provides additional room within the autorack for crew members to perform interior operations in the autorack and may reduce the likelihood vehicle damage caused by tight spaces within the autorack.

An additional technical advantage of particular embodiments may include adjustable decks of an autorack that may be raised or lowered within the autorack to accommodate a variety of load combinations, thereby increasing load efficiency.

A further technical advantage of particular embodiments may include an autorack that may be reconfigured between a tri-level and bi-level autorack by adding, removing, reconfiguring, and/or repositioning one or more decks of an autorack. Such an autorack may provide for quick and easy conversions, thereby reducing the cost and time of reconfiguring an autorack between different configurations.

Yet another technical advantage of particular embodiments may include an autorack with an adjustable roof height. The height of the autorack may be increased or decreased to accommodate a variety of load combinations and eliminate the need to purchase multiple autoracks with different heights to maximize loading efficiency.

Other technical advantages will be readily apparent to one of ordinary skill in the art from the following figures, descriptions, and claims included herein. Moreover, while specific advantages have been enumerated above, certain embodiments of the present disclosure may include all, some, or none of the enumerated advantages.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein.

DETAILED DESCRIPTION

Figure 1A:
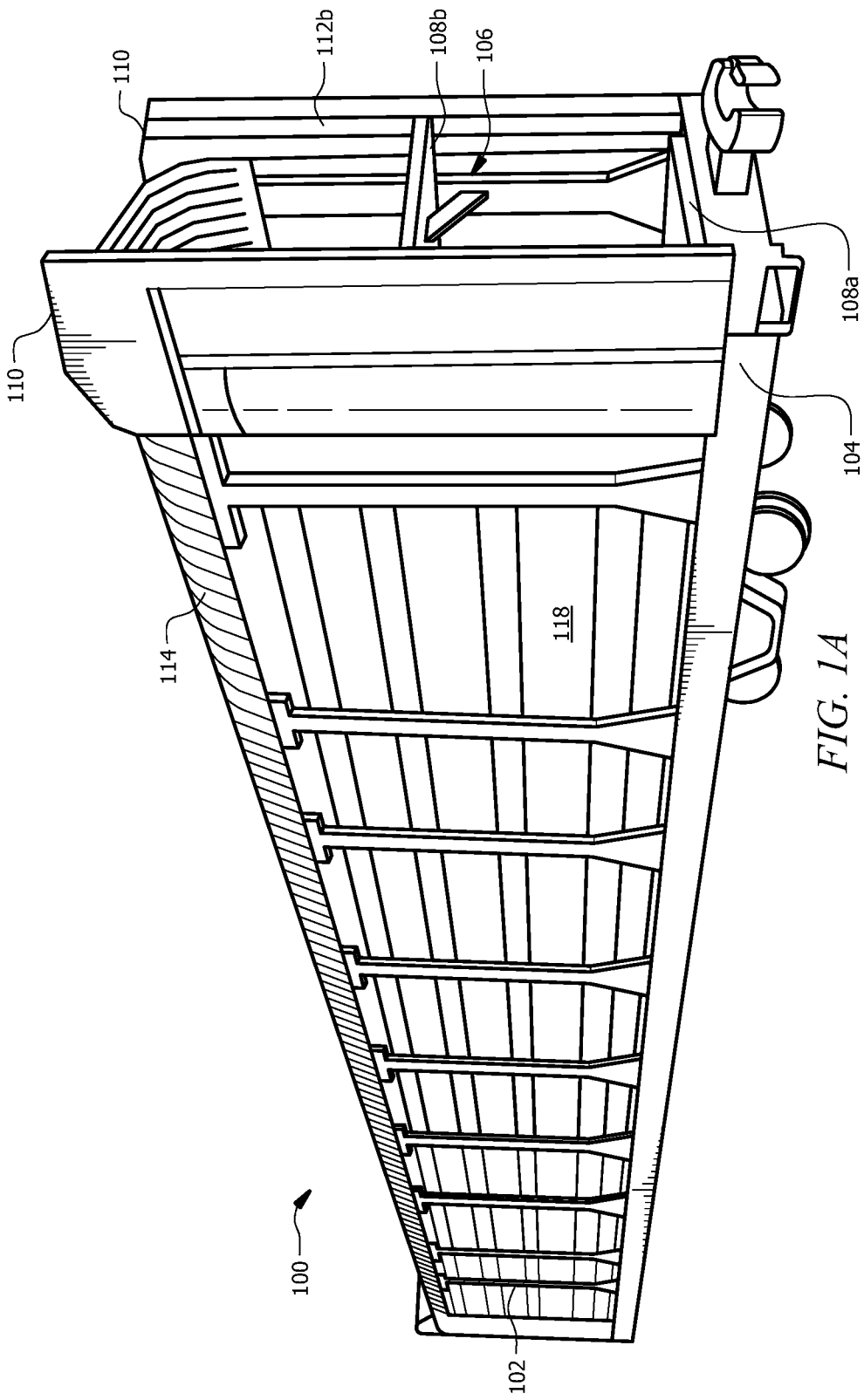
FIGS. 1A through 1F illustrate perspective, end, and side views of example autoracks of a system for reconfiguring an autorack in accordance with particular embodiments.
Figure 1B:
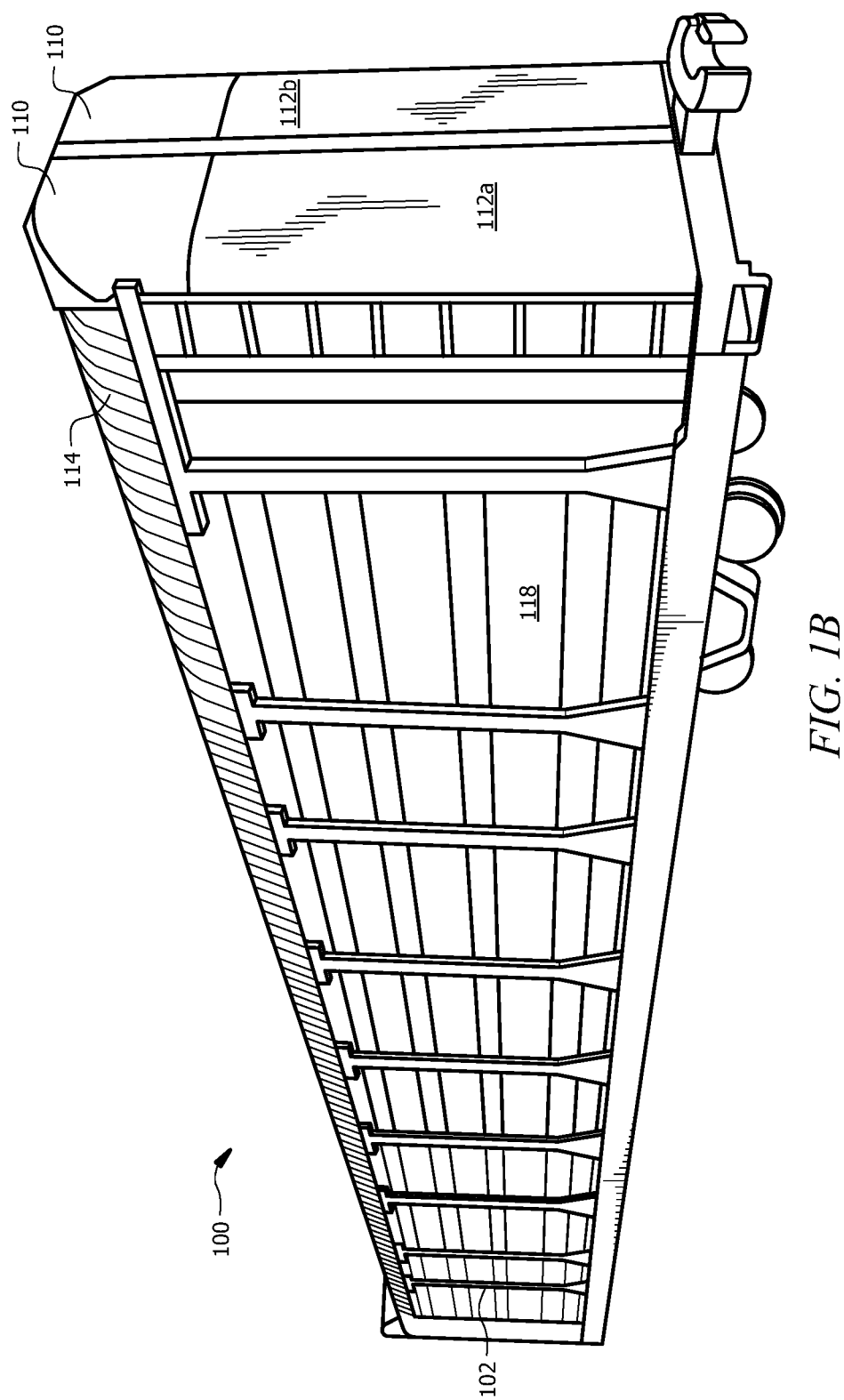

Particular embodiments and their advantages are best understood by referring to FIGS. 1A through 11 of the drawings, like numerals being used for like and corresponding parts of the various drawings.

Automobile manufacturers often transport vehicles via railroad lines on multi-deck railcars, such as autoracks. In general, autorack railcars are comprised of two components: a flat railcar and a rack. The rack may be a uni-level autorack, a bi-level autorack, a tri-level autorack, or a convertible autorack (e.g., a rack that may be configured as a uni-level, bi-level, and/or tri-level autorack). Racks typically have a condition-based life of usage. In contrast, flatcars have a limited age of usage based upon AAR standards. As a result, a flatcar of an autorack may age out and have to be replaced before the rack needs to be replaced. And any replacement of the flatcar or other components of the autorack may necessitate recertification of the autorack.

Moreover, when consumer demand for certain types and/or sizes of vehicles changes, so too does the demand for certain types of autoracks. Such changes frequently cause shortages in supply of one type of autorack and force autorack operators to invest in new equipment to meet demand and place out-of-demand equipment in storage. While railcar manufacturers developed convertible autorack railcars in response to the negative impacts of these changes in market demand, many non-convertible autoracks still exist in the industry. The teachings of this disclosure recognize that it would be desirable to provide a system and method for reconfiguring an autorack, and in particular, for reconfiguring an existing tri-level autorack into a bi-level or convertible autorack and reconfiguring an existing bi-level autorack into a tri-level or convertible autorack, for example, as part of an autorack recertification process.

FIGS. 1A through 1F illustrate perspective, end, and side views of example autoracks of a system for reconfiguring an autorack in accordance with particular embodiments. In general, system 100 includes an autorack 102. An autorack 102 may comprise any type of carrier capable of transporting vehicles. Examples of autoracks 102 may include railcars, trailers, tractor trailers, ships, and/or any other carrier capable of transporting vehicles. In certain embodiments, an autorack 102 may be a stand-alone autorack. Alternatively, an autorack 102 may be an articulated bi-level (ABL) autorack. Examples of vehicles that autorack 102 may transport include cars, trucks, buses, boats, aircrafts, any other automobile, or any combination of the preceding. In certain embodiments, an autorack 102 may be a bi-level autorack or a convertible autorack. In such embodiments, autorack 102 may be a recertified autorack and may have been reconfigured from a tri-level autorack (e.g., a railcar comprising three decks) to a bi-level autorack (e.g., a railcar comprising two decks) or a convertible autorack (e.g., a railcar that may be configured as a bi-level and a tri-level autorack by removing and adding a deck). Alternatively, autorack 102 may have been reconfigured from a bi-level autorack to a tri-level autorack or a convertible autorack. In certain embodiments, an autorack 102 may be a recertified autorack that has been reconfigured from a bi-level autorack, a tri-level autorack, or a convertible autorack to an hourglass shaped autorack. The present disclosure contemplates a reconfigured autorack 102 as including any number and combination of the following features: an increased height (e.g., from 19' to 20' 2"), a decreased height (e.g., from 20' 2' to 19'), an increased width, an adjustable roof height, one or more automatic moveable decks, an hour glass-shaped width design, and/or any other suitable features.

System 100 generally facilitates reconfiguring an autorack from a tri-level autorack into a bi-level autorack or a convertible autorack and reconfiguring a bi-level autorack into a tri-level autorack or a convertible autorack, for example, as part of an autorack recertification process (e.g., an Association of American Railroads (AAR) M-970 Recertification). During the conversion and/or recertification process, any of the following may be performed: (1) one or more cross-brace assemblies may be added, removed, and/or reconfigured (e.g., one or more cross-brace assemblies may be installed above one or more existing tri-level brace bays) and one or more hinged deck support points may be added or removed (e.g., one or more hinged deck support points may be decoupled from one or more posts); (2) one or more decks of an autorack may be removed, reconfigured (e.g., with a revised profile (3" camber), revised deck closure plates, etc.), and/or replaced (e.g., an existing deck may be replaced by a nesting deck configured to adjust in length, a wider deck, a deck with increased capacity, for example, from 24,000 pounds to 40,000 pounds); (3) one or more decks may be added to an autorack (e.g., a third deck may be added for tri-level configurations); (4) a vehicle restraint system of an autorack may be replaced (e.g., a tri-level vehicle restraint system (such as wheel chocks that attach to and are cantilevered over a bar attached to the deck adjacent to a driving surface of a deck of an autorack) may be replaced with a bi-level vehicle restraint system (such as wheel chocks that attach to steel wire grating panels fastened to the driving surface of a deck of an autorack), a bi-level vehicle restraint system may be replaced with a tri-level vehicle restraint system, or a bi-level or tri-level vehicle restraint system may be replaced with a universal vehicle restraint system that may be used for both bi-level and tri-level configurations); (5) a door structure of an autorack may be replaced (e.g., a conventional door structure may be replaced by a seal safe radial door (SSRD) structure (for improved security and ergonomics, better reliability, and reduced maintenance), entry doors may be exchanged with taller, shorter, or wider doors or doors with telescoping panels, and/or a set of door panels may be added to or removed from the existing entry doors); (6) a securement system may be installed on an autorack; (7) one or more posts of an autorack may be removed, replaced, and/or reconfigured (e.g., the width between posts on opposing sides of an autorack may be increased, for example, from 8'6" to 8'7"); (8) one or more connection plates for deck attachment locations may be added, removed, replaced, and/or reconfigured (e.g., to accommodate for an increased width of an autorack, additional decks, deck adjustment systems, quick deck attachment and detachment, etc.); (9) one or more side panels of an autorack may be removed, replaced, and/or reconfigured (e.g., to improve aerodynamics, accommodate for varying autorack width); (10) one or more roof sheets of an autorack may be added, removed, replaced, and/or reconfigured (e.g., to improve security, to accommodate for new entry doors, varying autorack width, and/or a change in autorack height); (11) a flatcar of an autorack may be reconfigured or replaced (e.g., to upgrade to the latest standards, improve loading capacity to 185,000 pounds or more, increase reliability and extend life, change "A" deck height, add gussets under posts 1 and 12 for increased capacity and improved reliability, and/or revise bridge place attachments to improve functionality); (12) a deck adjustment system may be installed to enable the height of one or more decks of an autorack to be adjusted; (13) a roof adjustment system may be installed to enable the height of the roof of an autorack to be adjusted (e.g., from 19' to approximately 20' 2"); (14) a side ladder assembly may be reconfigured or replaced to accommodate an increased or decreased height of an autorack; (15) the interior and/or exterior of an autorack may be blasted to remove corrosion and/or repainted (e.g., to improve safety, enhance ergonomics, and improve life); and/or (16) any other suitable modification or addition.

In certain embodiments, autorack 102 may include a flatcar 104, a bi-level rack structure 106, a plurality of decks 108, a door structure 110, a plurality of pairs of posts (not shown), a roof 114, and a plurality of side panels 118. Flatcar 104 may refer to the structural base of an autorack 102 and may be configured to support bi-level rack structure 106 or any other suitable rack structure. For example, bi-level rack structure 106 may be built upon at least a portion of flatcar 104. Bi-level rack structure 106 of autorack 102 generally includes two decks 108 and ten to twelve sets of posts (e.g., post sets 2 through 11, post sets 1 through 12).

Decks 108 may facilitate loading, transportation, and/or unloading of vehicles associated with autorack 102. Examples of decks 108 include an "A" deck 108a and a "B" deck 108b. "A" deck 108a may be positioned beneath "B" deck 108b. In certain embodiments, outer deck portions of "B" deck 108b may include hinge decks. A hinge deck generally may refer to an end portion of deck 108b that may be raised or lowered into various positions (such as a slanted or flat position). In such embodiments, one or more hinged deck support points may be positioned beneath a hinge deck and may be configured to support the hinge deck. Hinged deck support points may be coupled to one or more posts or one or more other structures. In certain embodiments, "B" deck 108b may include a first half and a second half. For example, deck 108b may be split into two halves of approximately equal length. A shim plate may be used to couple the two halves together to form deck 108b.

Each deck 108 may include deck plates. Deck plates may include flat/structural steel plates, corrugated steel plates, any other suitable types of plates of any suitable material, or any combination of the preceding. In certain embodiments, deck plates may be integrated into a driving surface of decks 108. The present disclosure contemplates autorack 102 including any number and combination of decks 108 and decks 108 including any number and combination of hinge decks, deck portions, deck types, and deck plates.

A door structure 110 of an autorack 102 may include doors 112, such as doors 112a and 112b. In certain embodiments, doors 112 may be seal safe radial doors. Advantages of such embodiments may include a reduction in theft, damage, and vandalism of vehicles being transported in an autorack 102. In certain embodiments, a door structure 110 of autorack 102 may include magnetically coupled door edge guards. Although autorack 102 is described as including certain door structures 110 and doors 112, this disclosure contemplates autorack 102 including any number and combination of door structures 110 and doors 112.

Bi-level autorack 102 may include posts 2 through 11. Each of posts 2 through 11 may refer to a pair of posts (e.g., post 2 may refer to posts 2a and 2b, post 3 may refer to posts 3a and 3b, post 4 may refer to posts 4a and 4b, and so on). Each pair of posts 2 through 11 includes a first post (e.g., a post 2a) located near a first side of an autorack and a second post (e.g., a post 2b) located near a second side of the autorack opposite the first side. Posts 2 through 11 may refer to straight posts, dog-leg posts, any other suitable type of posts, or any combination thereof. In certain embodiments, autorack 102 may include posts 1 through 12.

In certain embodiments, at least a portion of posts 2 through 11 may be telescopic posts. In such an embodiment, the telescopic posts may be coupled to a section of roof 114 and configured to allow a height of roof 114 to be increased or decreased. For example, roof 114 may be raised or lowered when telescopic posts are unfastened, which allows the telescopic posts to telescope when ball screws are turned. The telescoping posts may be locked into position at the desired length once roof 114 has been repositioned.

Figure 1C:
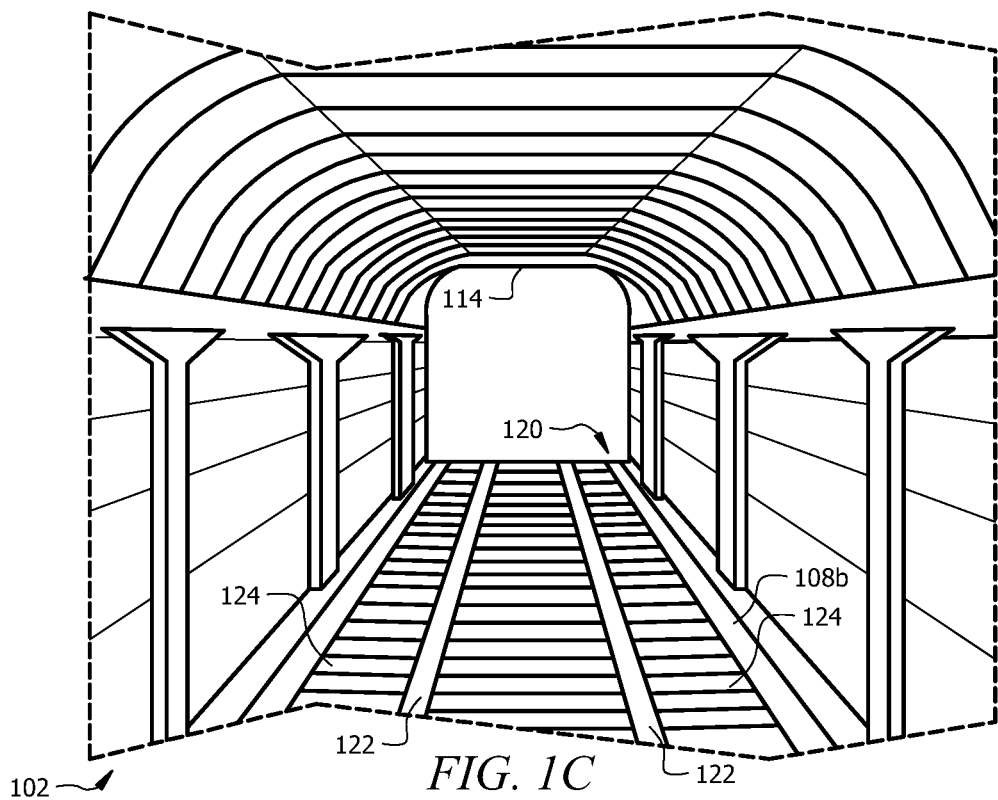
Figure 1D:
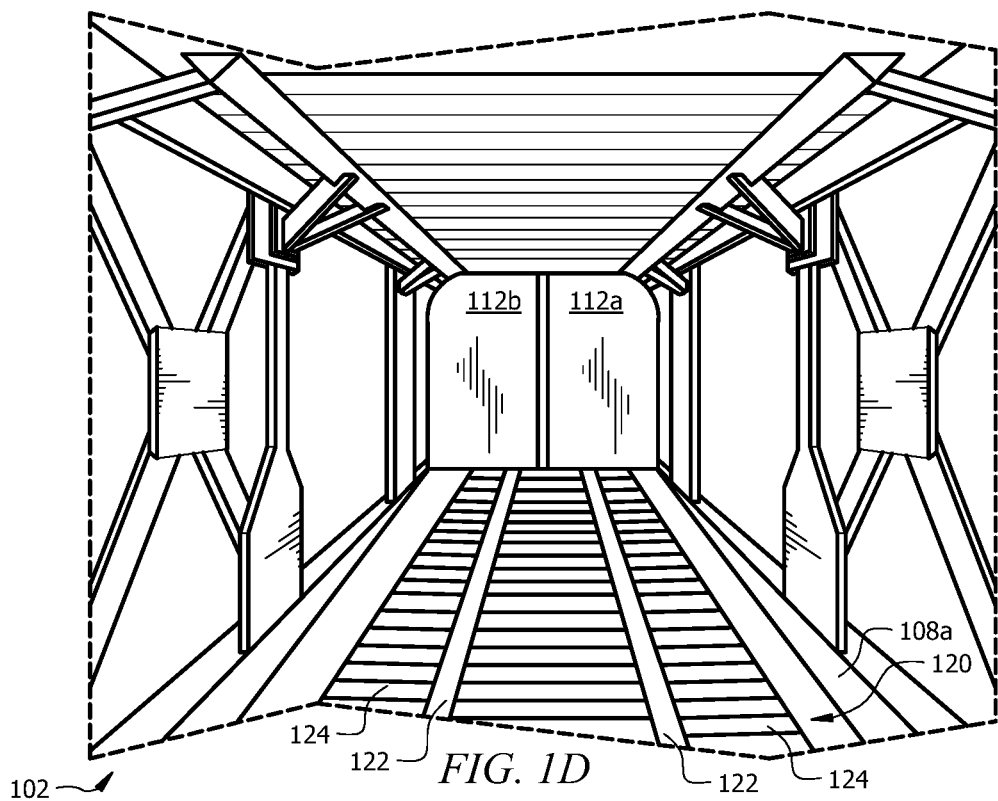
Figure 1E:
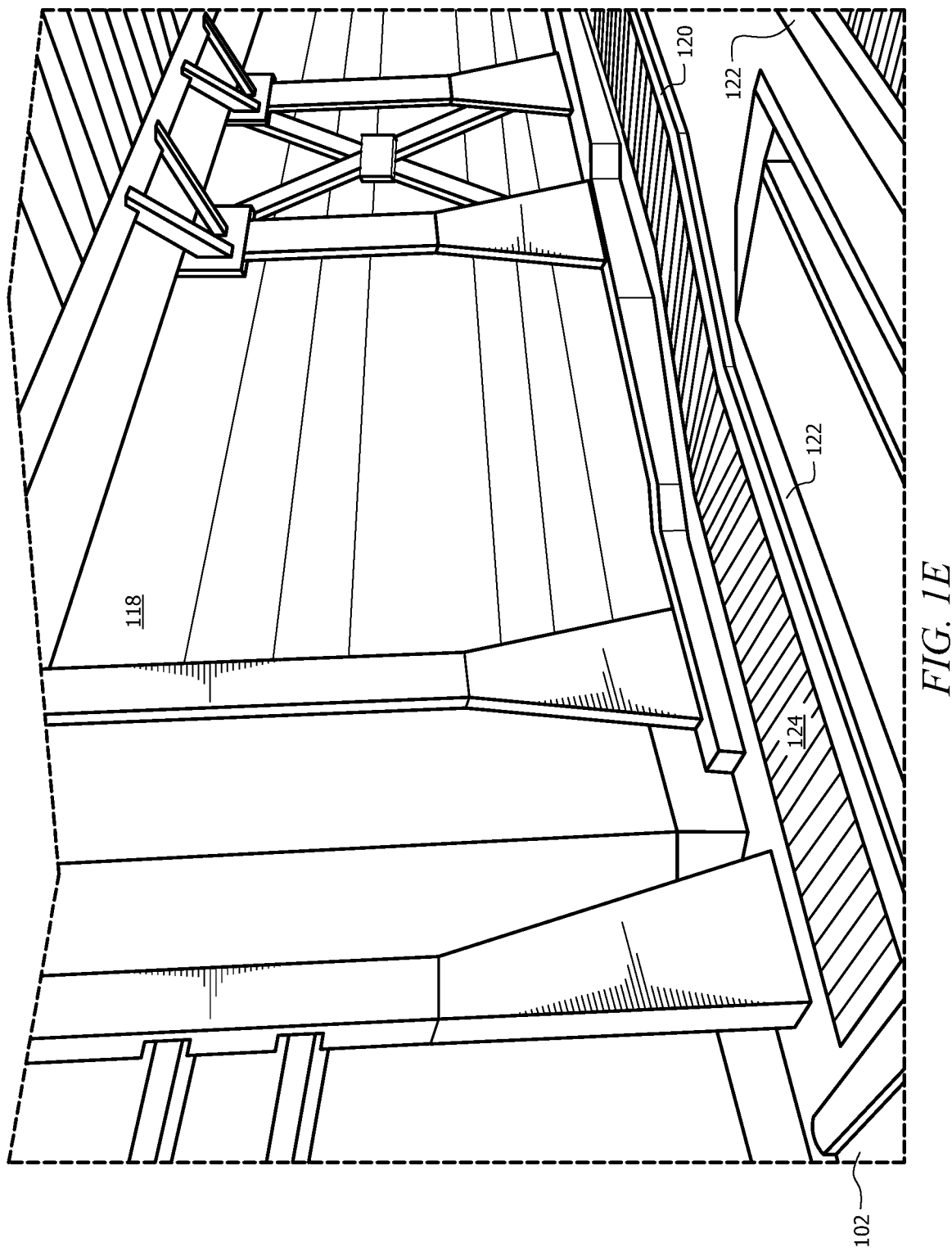
Figure 1F:
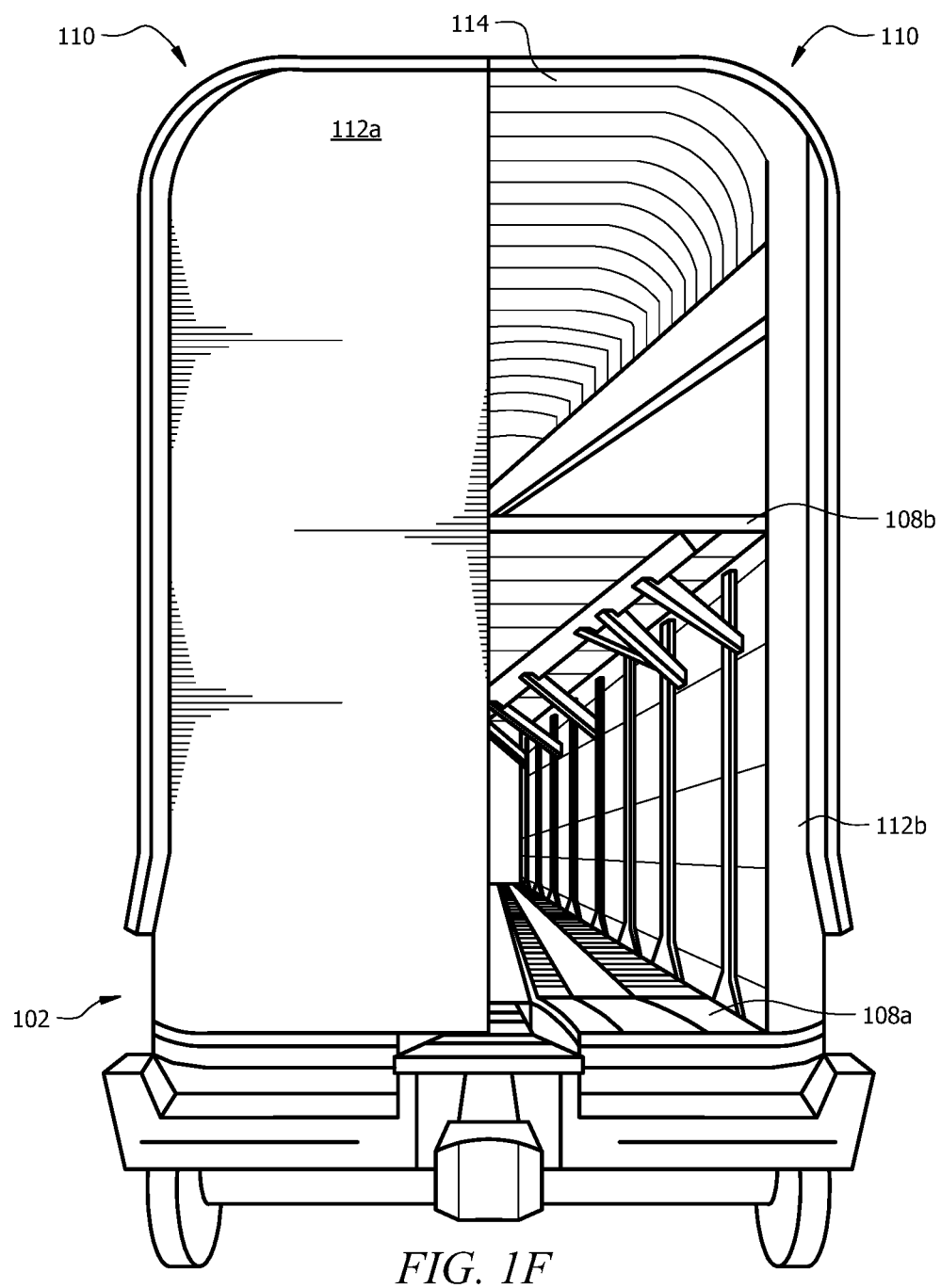

As illustrated in FIGS. 1C through 1E, an autorack 102 typically includes a vehicle restraint assembly 120. Vehicle restraint assembly 120 may be configured to secure vehicles to a deck 108 of autorack 102 during shipment. In certain embodiments, a vehicle restraint assembly 120 may refer to a bi-level vehicle restraint assembly and may include one or more wheel chocks (not shown), tire guides 122, grating 124, any other suitable components, and/or any combination thereof. Alternatively, a vehicle restraint assembly 120 may refer to a universal vehicle restraint assembly and may be utilized for both bi-level and tri-level configurations.

Figure 9:
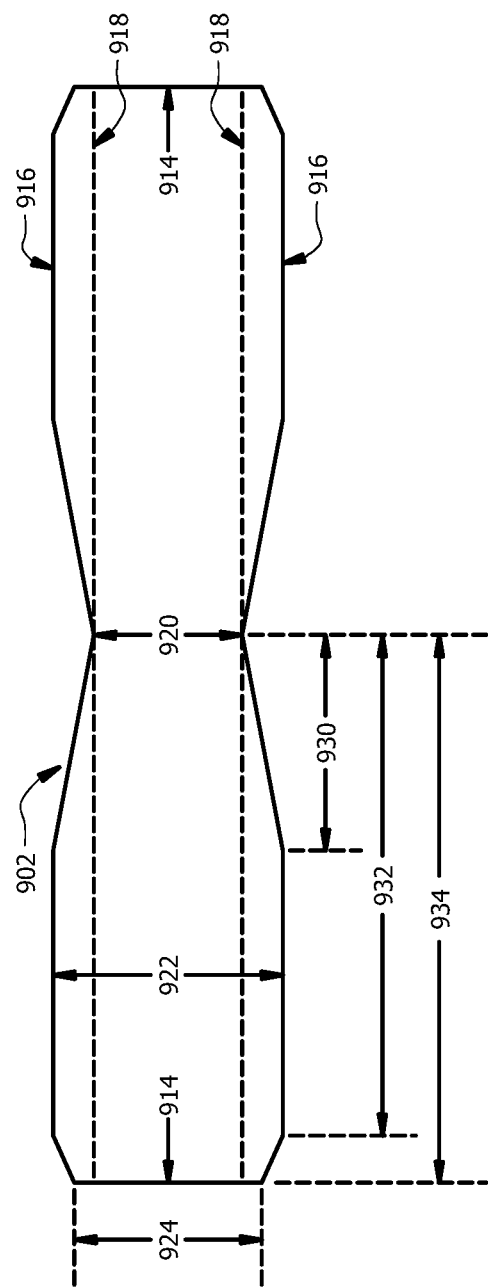
FIG. 9 illustrates a top view of an example autorack of a system for reconfiguring an autorack in accordance with certain embodiments.

Although FIGS. 1A through 1F illustrate system 100 as including a certain number of autoracks 102, flatcars 104, racks 106, decks 108, door structures 110, doors 112, and side panels 118, system 100 may include any number of autoracks 102, flatcars 104, racks 106, decks 108, door structures 110, doors 112, side panels 118, and other suitable components. Additionally, although particular examples of autoracks 102, flatcars 104, racks 106, decks 108, door structures 110, doors 112, and side panels 118 have been described, the present disclosure contemplates any suitable autoracks 102, flatcars 104, racks 106, decks 108, door structures 110, doors 112, and side panels 118 comprising any suitable components configured in any suitable manner. For example, autorack 102 may be a convertible autorack with three-adjustable decks and configured to convert between a bi-level configuration and a tri-level configuration, as described in more detail below with respect to FIGS. 10A and 10B. As another example, autorack 102 may have an adjustable roof height, as described in more detail below with respect to FIGS. 10A and 10B. As yet another example, autorack 102 may have a varying width and an hourglass shape, as illustrated in FIG. 9. It should be understood that the present disclosure contemplates any suitable autorack 102 comprising any suitable features and components configured in any suitable manner.

Figure 2:
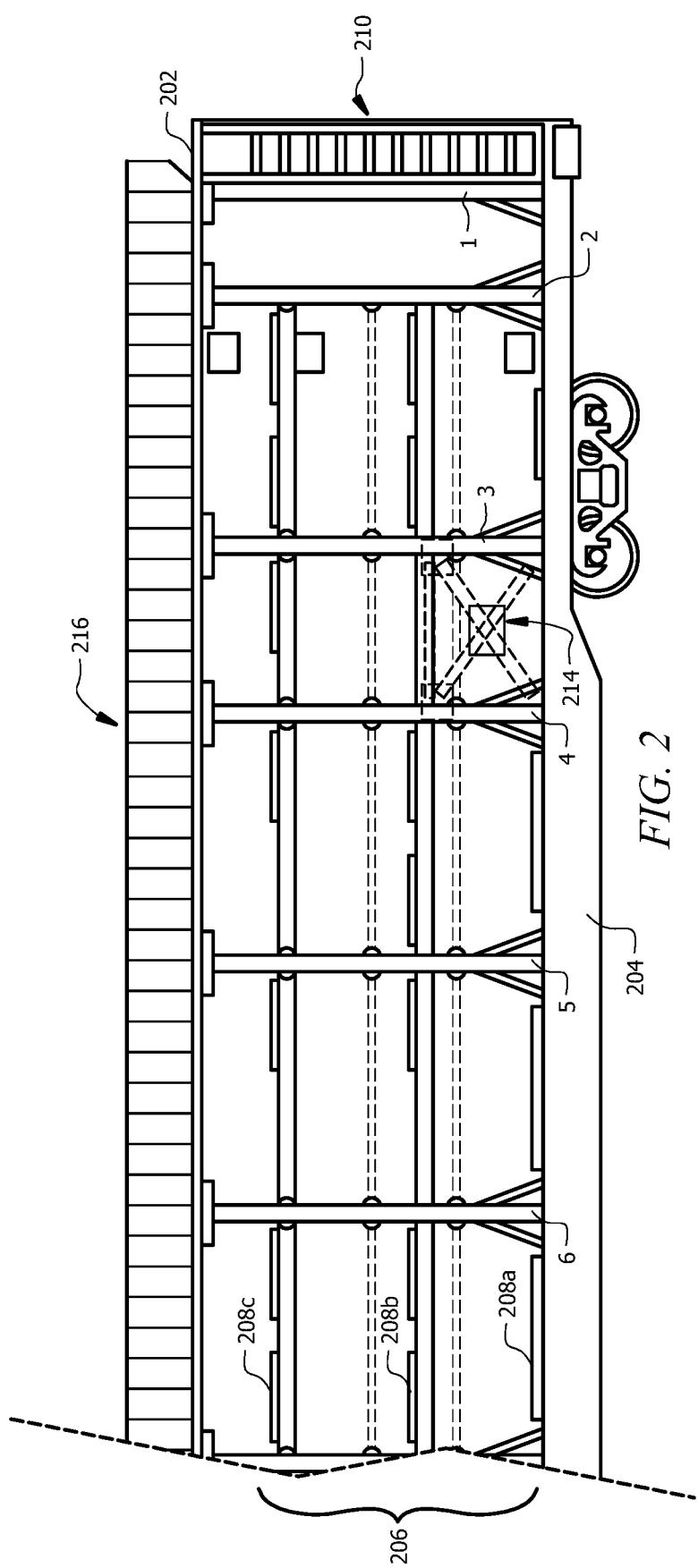
FIG. 2 illustrates a partial side view of an example of a conventional tri-level autorack in accordance with certain embodiments.

FIG. 2 illustrates a partial side view of an example of a conventional tri-level autorack in accordance with certain embodiments. A tri-level autorack 202 may include a flatcar 204, a tri-level rack structure 206, a plurality of decks 208, a door structure 210, a plurality of tri-level brace bays 214, a roof 216, and post pairs 1 through 12. Flatcar 204 may refer to the structural base of a tri-level autorack 202 and may be configured to support tri-level rack structure 206. For example, tri-level rack structure 206 may be built upon at least a portion of flatcar 204. Tri-level rack structure 206 of tri-level autorack 202 generally includes three decks 208 and post pairs 1 through 12.

Decks 208 may facilitate loading, transportation, and/or unloading of vehicles associated with tri-level autorack 202. Examples of decks 208 include an "A" deck 208a, a "B" deck 208b, and a "C" deck 208c. "A" deck 208a may be positioned beneath "B" deck 208b, and "B" deck 208b may be positioned beneath "C" deck 208c. In certain embodiments, outer deck portions of "B" deck 208b may include hinge decks. A hinge deck generally may refer to an end portion of deck 208b that may be raised or lowered into various positions (such as a slanted or flat position). In such embodiments, one or more hinged deck support points may be coupled to a portion of autorack 202 located beneath a hinge deck and may be configured to support the hinge deck. In some embodiments, "C" deck 208c may include hinge decks.

Each deck 208 may include deck plates. Deck plates may include flat/structural steel plates, corrugated steel plates, any other suitable types of plates of any suitable material, or any combination of the preceding. In certain embodiments, deck plates may be integrated into a driving surface of decks 208. The present disclosure contemplates tri-level autorack 202 including any number and combination of decks 208 and decks 208 including any number and combination of hinge decks, deck portions, deck types, and deck plates.

Tri-level brace bays 214 of tri-level autorack 202 are generally configured to support decks 208. For example, tri-level brace bay 214 may be configured to support at least a portion of deck 208b. Another tri-level brace bay (not shown) may be configured to support at least a portion of deck 208c. Although tri-level autorack 202 is described as including certain tri-level brace bays 214, this disclosure contemplates tri-level autorack 202 including any number and combination of tri-level brace bays 214. For example, autorack 202 may include two tri-level brace bays 214 configured to support at least a portion of deck 208b and/or deck 208c, three tri-level brace bays 214 configured to support at least a portion of deck 208b and/or deck 208c, four tri-level brace bays 214 configured to support at least a portion of deck 208b and/or deck 208c, and so on.

Tri-level autorack 202 may include posts 1 through 12. Each of posts 1 through 12 may refer to a pair of posts (e.g., post 1 may refer to posts 1*a* and 1*b*, post 2 may refer to posts 2*a* and 2*b*, post 3 may refer to posts 3*a* and 3*b*, and so on). Each pair of posts 1 through 12 includes a first post (e.g., a post 1*a*) located near a first side of an autorack and a second post (e.g., a post 1*b*) located near a second side of the autorack opposite the first side. Posts 1 through 12 may refer to straight posts, dog-leg posts, any other suitable type of posts, or any combination thereof.

In conventional autoracks, such as tri-level autoracks 202, posts 1 through 4 and posts 8 through 12 may be attached to one or more decks 208 such that removal of the one or more decks 208 from tri-level autorack 202 also removes posts 1 through 4 and posts 8 through 12. On the other hand, posts 5 through 6 and posts 11 through 12 may remain attached to a flatcar 204 of a tri-level autorack 202.

Figure 10A:
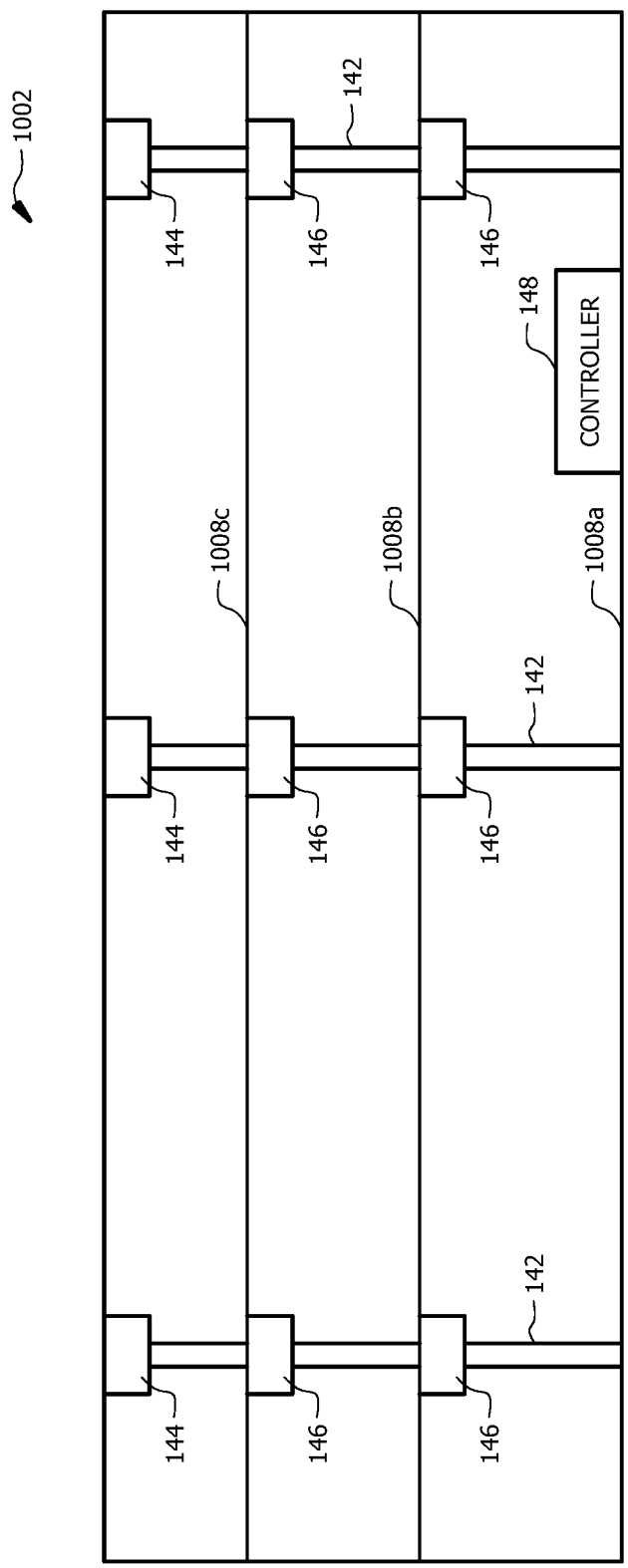
FIGS. 10A and 10B illustrate side views of an example autorack of a system for reconfiguring an autorack in accordance with certain embodiments.

In general, a tri-level autorack (such as tri-level autorack 202) may be converted into a bi-level autorack (such as bi-level autorack 102) and vice versa. In addition, a tri-level autorack (such as tri-level autorack 202) or a bi-level autorack (such as bi-level autorack 102) may be converted into a convertible autorack (as shown in FIG. 10A) and/or an hour-glass shaped autorack (as shown in FIG. 9).

To convert tri-level autorack 202 into bi-level autorack 102 (or a convertible autorack, such as autorack 1002 of FIG. 10A), deck 208*c* of tri-level autorack 202 may first be removed. Deck 208*b* also may be removed. In certain embodiments, each of decks 208*b* and 208*c* may be removed as one piece and may be reworked, replaced in part, or replaced in whole. In alternative embodiments, each of decks 208*b* and 208*c* may be split into two or more sections (e.g., split in half) and each section may be removed separately.

Once deck 208*c* and/or deck 208*b* have been removed, a cross-brace assembly may be installed above each existing tri-level brace bay (such as tri-level brace bay 214). Post pairs 1 and 12 may be removed. In certain embodiments, one or more hinged deck support points may also be removed or reconfigured to, for example, provide additional clearance for vehicles loaded onto deck 208*a* and/or deck 208*b*. Deck 208*b* and/or deck 208*c* may then be reinstalled and positioned above or below the cross-brace assemblies. Alternatively, a replacement deck may be installed and positioned above or below the cross-brace assemblies.

In addition or in alternative to the above steps, reconfiguring tri-level autorack 202 into bi-level autorack 102 (or a convertible autorack, such as autorack 1002 of FIG. 10A), for example, as part of a recertification process may include: (1) blasting the interior and/or exterior of the autorack to remove corrosion; (2) repainting the interior and/or exterior of the autorack; (3) replacing the flatcar (e.g., with an hourglass-shaped flatcar); (4) replacing an existing vehicle restraint system (e.g., replacing a tri-level vehicle restraint system (such as wheel chocks that attach to and are cantilevered over a bar attached to the deck adjacent to a driving surface of a deck of an autorack) with a bi-level vehicle restraint system (such as wheel chocks that attach to steel wire grating panels fastened to the driving surface of a deck of an autorack) or universal vehicle restraint system); (5) replacing an existing door structure (e.g., replacing a conventional door structure with an updated door structure (such as a seal safe radial door (SSRD) structure), exchanging entry doors with taller, wider, shorter, or telescoping doors, and/or adding or removing a set of door panels from the existing entry doors); (6) removing, replacing, and/or reconfiguring one or more posts (e.g., increasing the width between posts on opposing sides of the autorack, relocating posts, etc.); (7) installing a securement system on the autorack, either a bi-level or tri-level vehicle securement system as required; (8) adding, removing, replacing, and/or reconfiguring one or more side panels of the autorack (e.g., replacing existing side screens with taller, shorter, or telescoping side screens); (9) adding, removing, replacing, and/or reconfiguring one or more roof sheets of the autorack (e.g., to accommodate a new door structure, an increased autorack height, an increased width of an autorack); (10) removing, replacing, and/or reconfiguring an existing roof assembly (e.g., reconfiguring the roof assembly for a new door structure (such as a door structure with upper canopies) and/or increased autorack height, removing the roof assembly for re-coating, etc.); (11) adding, removing, and/or reconfiguring connection plates to the posts for application of decks at new and/or adjustable heights (If transforming a bi-level to a tri-level, connection plates need to be added to connect the additional deck and to connect the existing deck in a new location. The existing bolting plates will be left in place for when the rack could be converted back to a bi-level; similarly when transforming a tri-level to a bi-level, connection plates may have to be added to the posts to attach the one remaining deck at the proper location for bi-level racks, leaving the existing connection plates in place for when the rack may be converted back to tri-level configuration at a later time); (12) installing a deck adjustment system to enable the height of one or more decks of an autorack to be adjusted; (13) installing a roof adjustment system to enable the height of the roof of an autorack to be adjusted (e.g., from 19' to approximately 20' 2" and vice versa); (14) replacing and/or reconfiguring a side ladder assembly to accommodate an increased autorack height; (15) installing a magnetic door edge guard assembly; (16) any other suitable modification, replacement, or addition; and/or (17) any combination of the proceeding. It should be understood that any of the preceding may occur in any suitable order and in any suitable manner. In certain embodiments, after the conversion process, any necessary components are replaced and/or repaired, and the autorack is repainted and re-decaled, the autorack may be recertified.

Although particular examples of reconfiguring tri-level autorack 202 into a bi-level or convertible autorack have been described, it should be understood that the present disclosure contemplates reconfiguring autorack 202 into any suitable type of autorack in any suitable manner. Additionally, although particular examples of autorack 202, flatcar 204, rack 206, decks 208, door structures 210, and posts 1 through 12 have been described, the present disclosure contemplates any suitable autorack 202, flatcar 204, rack 206, decks 208, door structures 210, and posts 1 through 12 comprising any suitable components configured in any suitable manner. Moreover, any component of FIG. 2 may be separate from or integral to any other component of FIG. 2.

Figure 3:
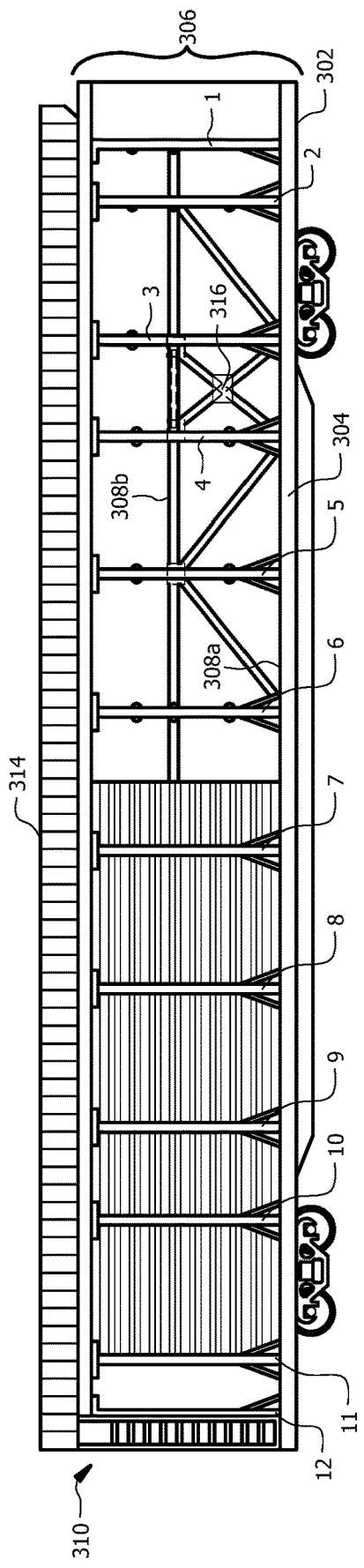
FIG. 3 illustrates a side view of an example of a conventional bi-level autorack in accordance with certain embodiments.

FIG. 3 illustrates a side view of an example of a conventional bi-level autorack in accordance with certain embodiments. A bi-level autorack 302 may include a flatcar 304, a bi-level rack structure 306, a plurality of decks 308, a door structure 310, a roof 314, a plurality of bi-level brace bays 316, and a plurality of posts 1 through 12. Flatcar 304 may refer to the structural base of a bi-level autorack 302 and may be configured to support bi-level rack structure 306. For example, bi-level rack structure 306 may be built upon at least a portion of flatcar 304. Bi-level rack structure 306 generally includes two decks 308 and post pairs 1 through 12.

Decks 308 may facilitate loading, transportation, and/or unloading of vehicles associated with bi-level autorack 302. Examples of decks 308 include an "A" deck 308*a* and a "B"

deck 308b. "A" deck 308a may be positioned beneath "B" deck 308b. In certain embodiments, outer deck portions of "B" deck 308b may include hinge decks. A hinge deck generally may refer to an end portion of deck 308b that may be raised or lowered into various positions (such as a slanted or flat position). In such embodiments, one or more hinged deck support points may be coupled to a portion of autorack 302 located beneath a hinge deck and may be configured to support the hinge deck. In certain embodiments, "B" deck 308b may include a first half and a second half. For example, deck 308b may be split into two halves of approximately equal length. A shim plate may be used to couple the two halves together to form deck 308b.

Each deck 308 may include deck plates. Deck plates may include flat/structural steel plates, corrugated steel plates, any other suitable types of plates of any suitable material, or any combination of the preceding. In certain embodiments, deck plates may be integrated into a driving surface of decks 308. The present disclosure contemplates bi-level autorack 302 including any number and combination of decks 308 and decks 308 including any number and combination of hinge decks, deck portions, deck types, and deck plates.

In general, bi-level brace bays 316 of bi-level autorack 302 are configured to support decks 308. For example, a bi-level brace bay 316 may be configured to support at least a portion of deck 308b. Another bi-level brace bay (not shown) may be configured to support at least another portion of deck 308b. Although bi-level autorack 302 is described as including certain bi-level brace bays 316, this disclosure contemplates bi-level autorack 302 including any number and combination of bi-level brace bays 316. For example, autorack 302 may include two bi-level brace bays 316 configured to support at least a portion of deck 308b, three bi-level brace bays 316 configured to support at least a portion of deck 308b, four bi-level brace bays 316 configured to support at least a portion of deck 308b, and so on.

Bi-level autorack 302 may include posts 1 through 12. Each of posts 1 through 12 may refer to a pair of posts (e.g., post 1 may refer to posts 1a and 1b, post 2 may refer to posts 2a and 2b, post 3 may refer to posts 3a and 3b, and so on). Each pair of posts 1 through 12 includes a first post (e.g., a post 1a) located near a first side of an autorack and a second post (e.g., a post 1b) located near a second side of the autorack opposite the first side. Posts 1 through 12 may refer to straight posts, dog-leg posts, any other suitable type of posts, or any combination thereof.

In certain embodiments, autorack 302 may be reconfigured into a tri-level autorack, such as a tri-level autorack 202. Reconfiguring a bi-level autorack into a tri-level autorack may include coupling additional deck connection plates to a rack structure of the autorack to connect an additional deck (e.g., a "C" deck 208c of FIG. 2) and to connect an existing deck (e.g., a "B" deck 208b of FIG. 2 or a "B" deck 308b of FIG. 3) in a new location. The existing bolting plates of the autorack (e.g., bolting plates used for a bi-level configuration) may be left in place such that the autorack may be converted back to a bi-level configuration. After installing additional deck connection plates and/or reconfiguring existing deck connection plates, deck 308b may be reinstalled within autorack 302 at an appropriate location and coupled to one or more deck connection plates and a deck 208c may be installed within autorack 302 at an appropriate location above deck 308b and coupled to one or more deck connection plates. The reconfiguration process also may include one or more of the steps described above with respect to FIGS. 1A through 2.

As described in more detail below with respect to FIGS. 9 and 10, in certain embodiments an autorack 302 may be reconfigured into a convertible autorack with three-adjustable decks and may convert between a bi-level configuration and a tri-level configuration. Additionally, or alternatively, an autorack 302 may be reconfigured to have an adjustable roof height. In certain embodiments, an autorack 302 may be reconfigured to have a variable width and may refer to an hourglass-shaped autorack.

Although FIG. 3 illustrates bi-level autoracks 302 as including a particular number of flatcars 304, racks 306, decks 308, door structures 310, brace bays 316, and posts 1 through 12, autoracks 302 may include any number of flatcars 304, racks 306, decks 308, door structures 310, brace bays 316, posts 1 through 12, and other suitable components. Additionally, although particular examples of autoracks 302, flatcars 304, racks 306, decks 308, door structures 310, brace bays 316, and posts 1 through 12 have been described, the present disclosure contemplates any suitable autoracks 302, flatcars 304, racks 306, decks 308, door structures 310, brace bays 316, and posts 1 through 12 comprising any suitable components configured in any suitable manner. Moreover, any component of FIG. 3 may be separate from or integral to any other component of FIG. 3.

Figure 4A:
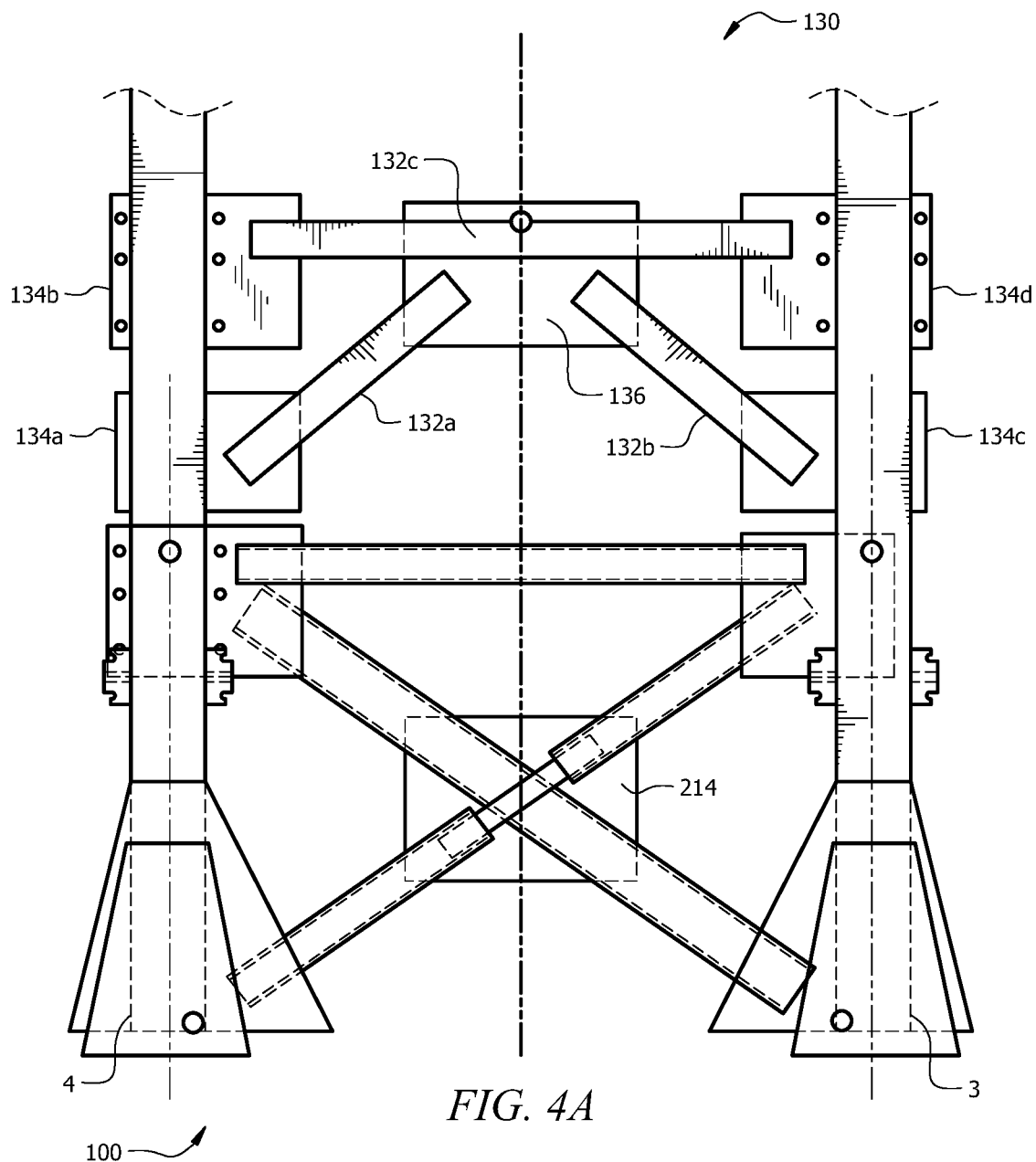
FIGS. 4A and 4B illustrate side views of an example of a cross-brace assembly of a system for reconfiguring an autorack in accordance with particular embodiments.
Figure 4B:
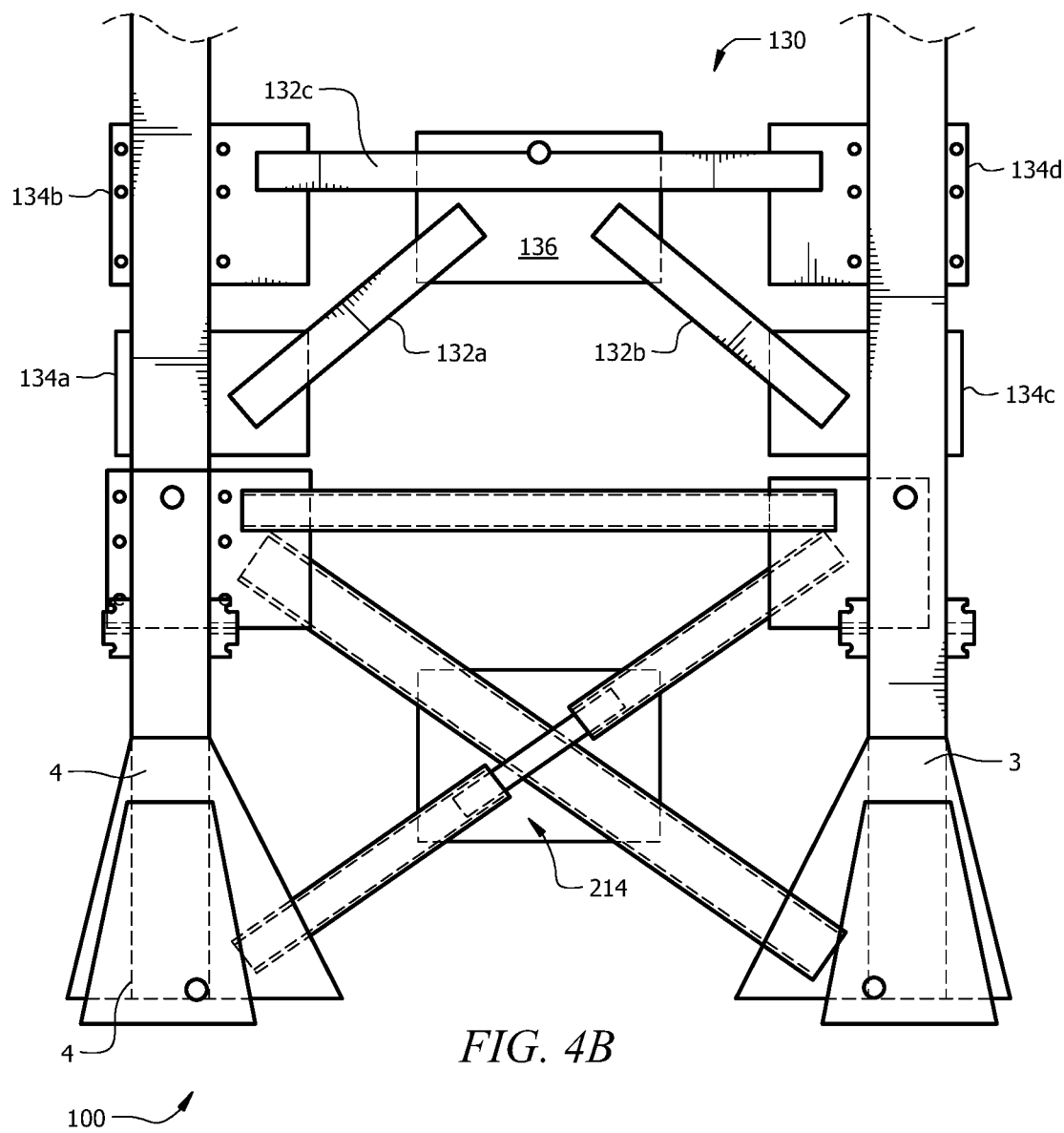
Figure 5A:
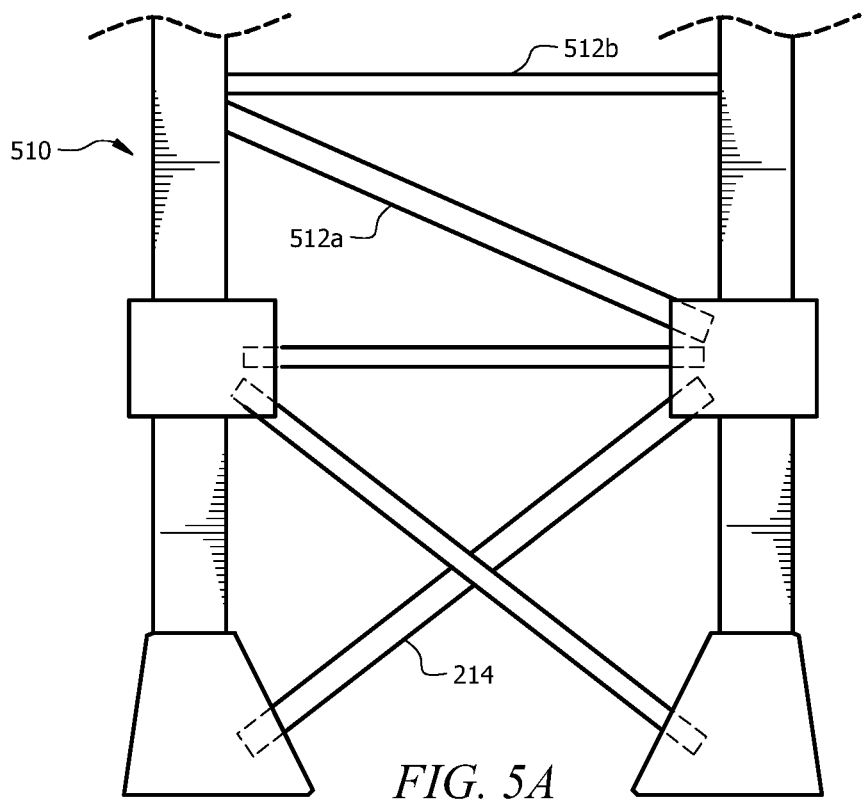
FIGS. 5A through 5D illustrate side views of examples of various cross-brace assemblies of a system for reconfiguring an autorack in accordance with particular embodiments.
Figure 5B:
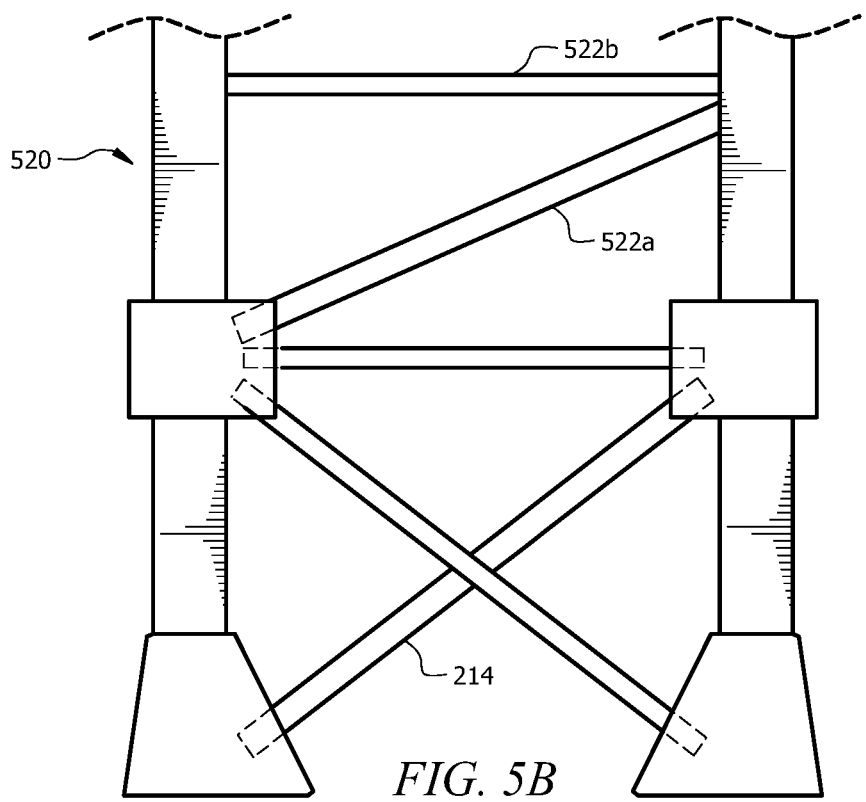
Figure 5C:
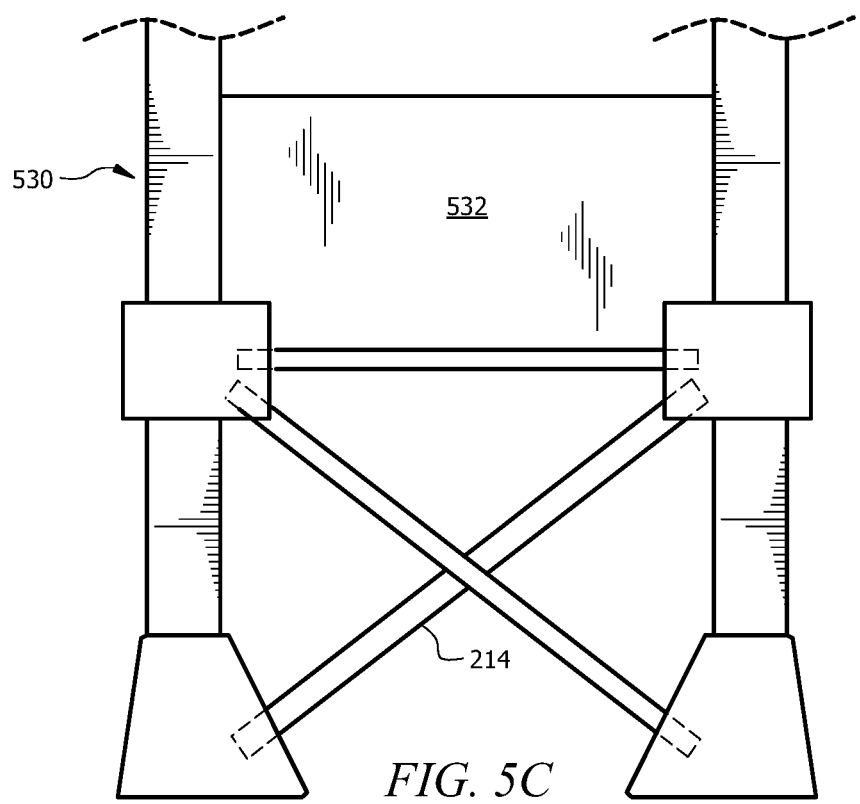
Figure 5D:
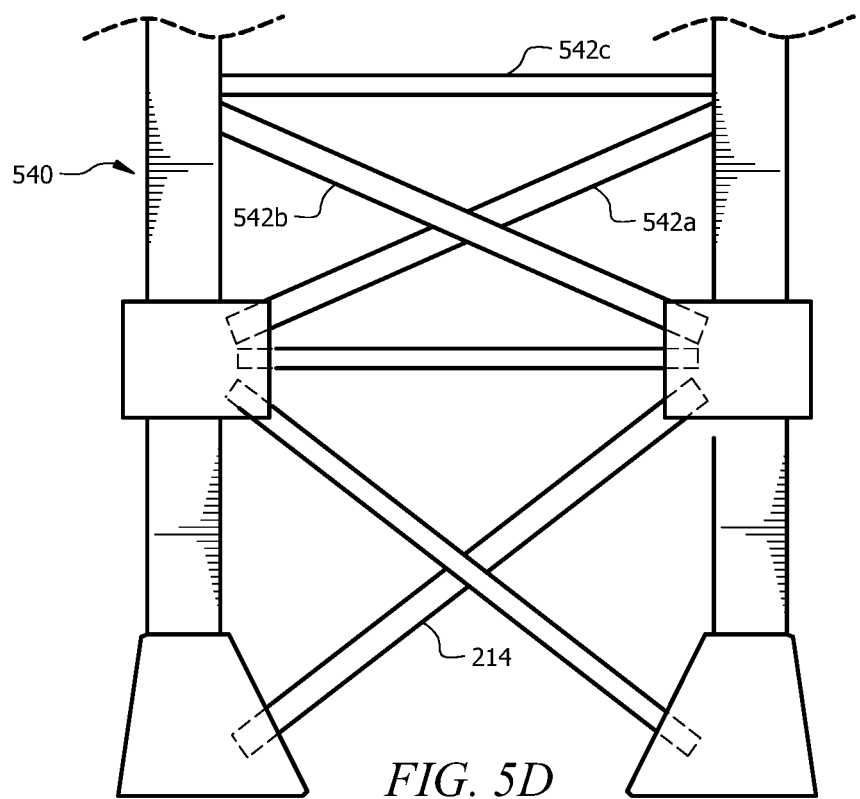
Figure 6A:
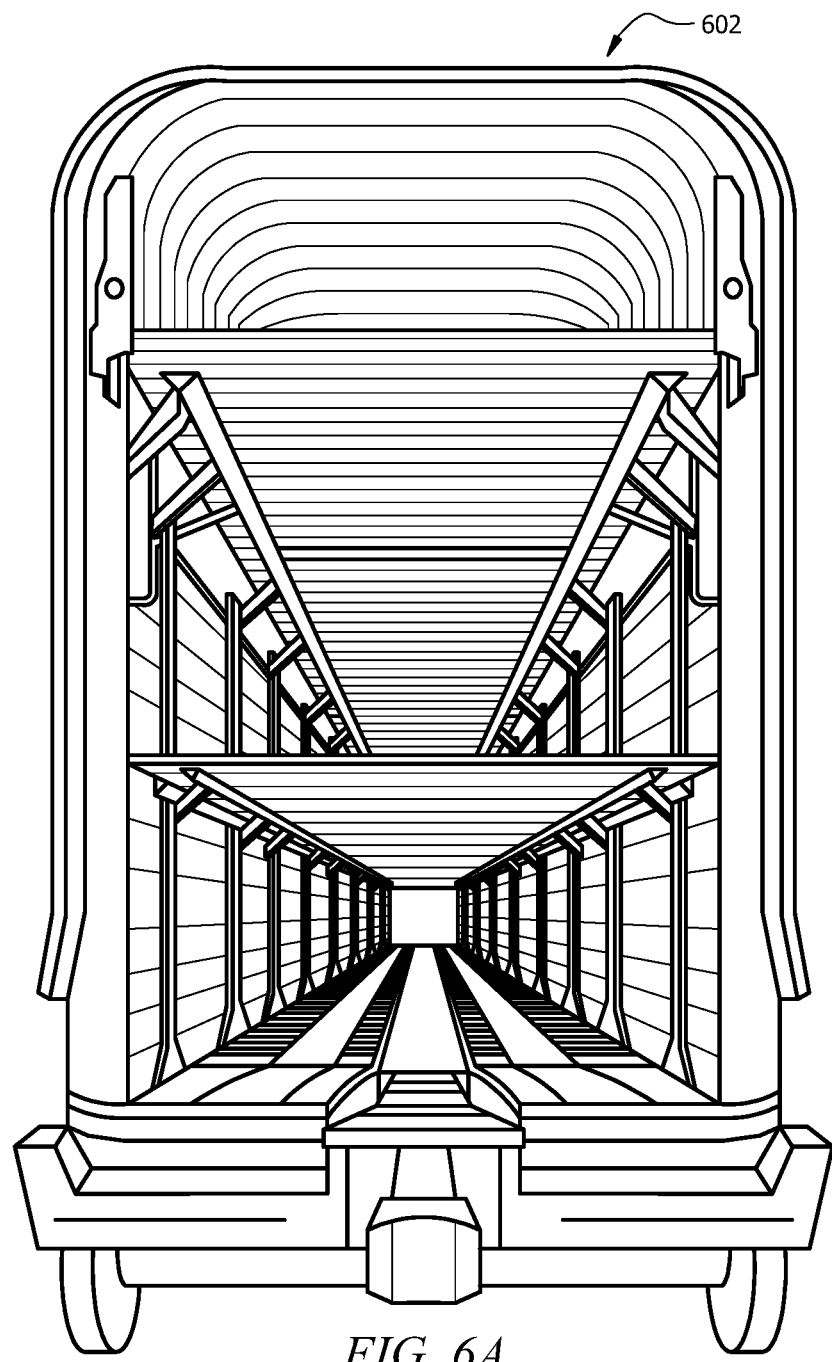
FIGS. 6A through 6D illustrate end and perspective views of an example of a tri-level autorack being converted into a bi-level autorack.
Figure 6B:
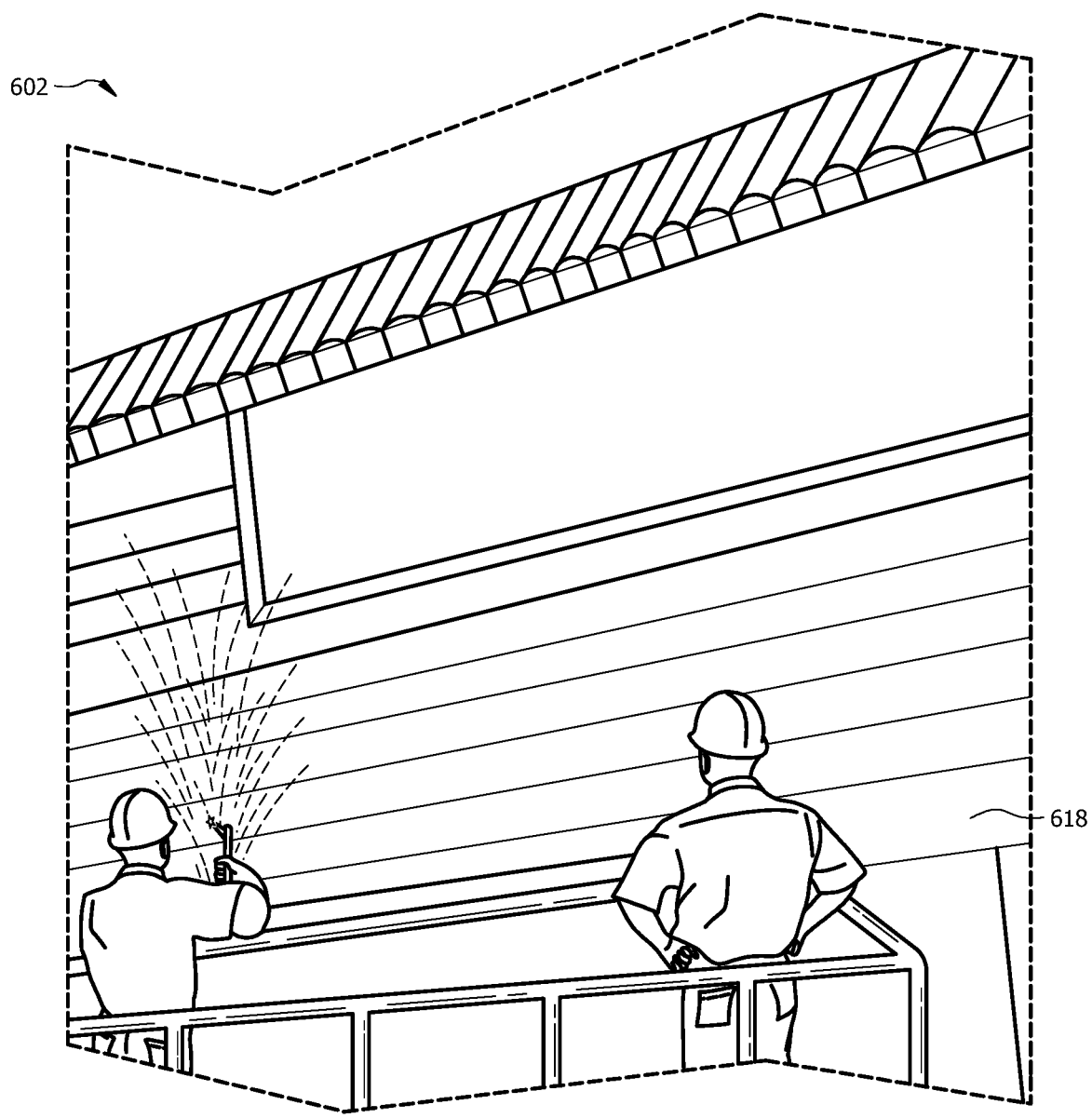
Figure 6C:
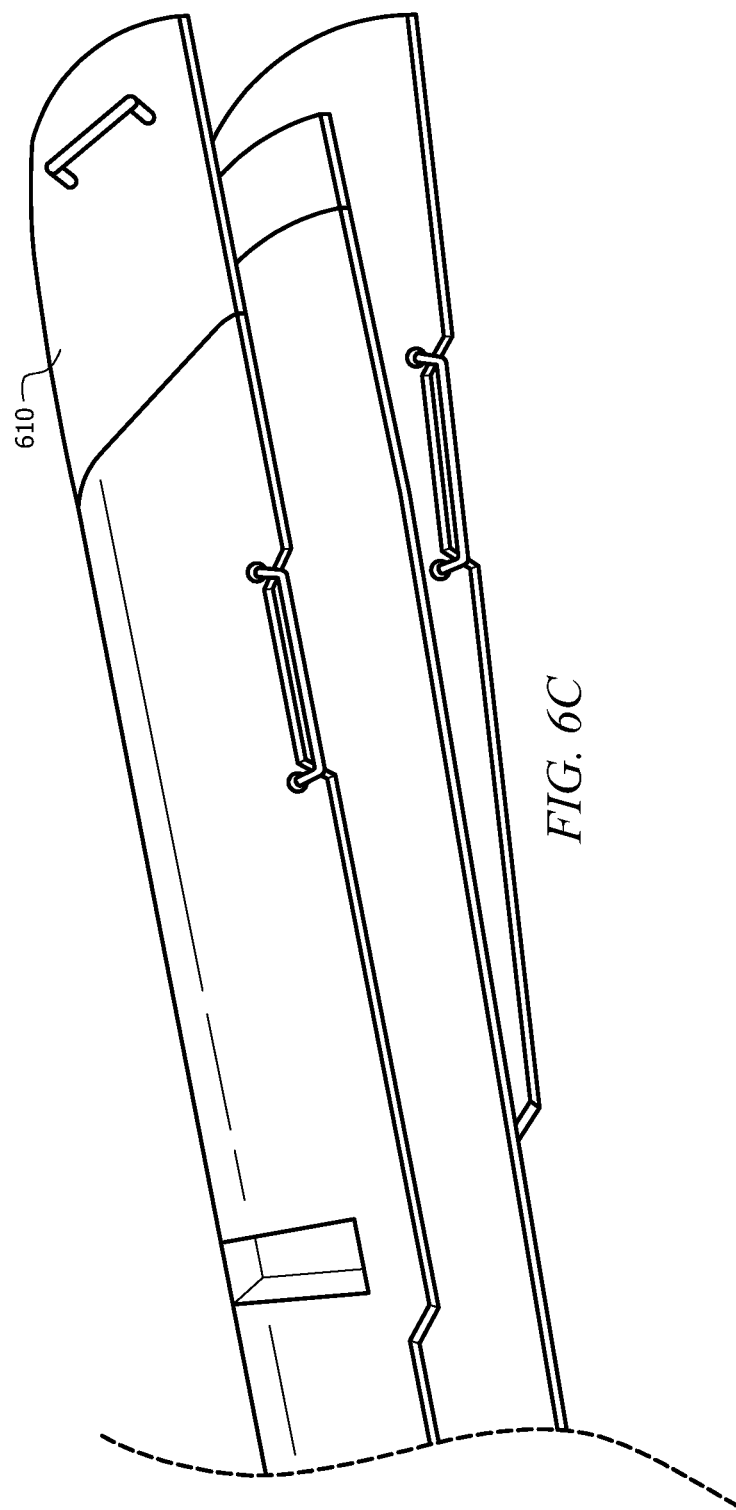
Figure 6D:
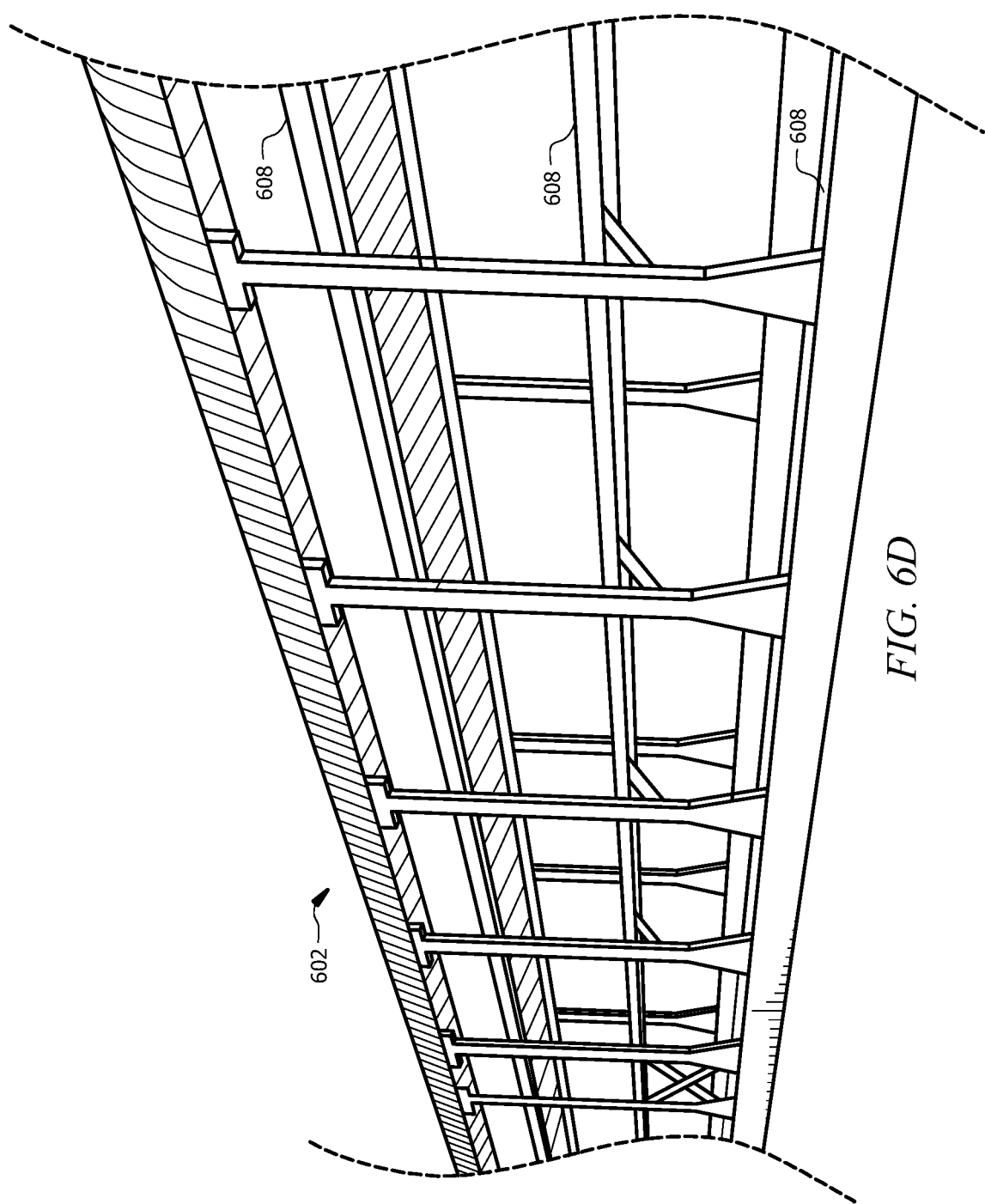

FIGS. 4A and 4B illustrate side views of an example of a cross-brace assembly of a system for reconfiguring an autorack in accordance with particular embodiments. System 100 generally includes an autorack 102 comprising a plurality of cross-brace assemblies 130 each configured to support and stabilize at least a portion of a deck 108 of autorack 102 (such as a portion of a deck 108b of FIGS. 1A through 1F or a patio of deck 208b and/or deck 208c of FIG. 2). According to various embodiments, each cross-brace assembly 130 may be coupled to two posts at a location above an existing tri-level brace bay (such as tri-level brace bay 214 of FIG. 2). As such, cross-brace assemblies 130 may facilitate reconfiguring a tri-level autorack into a bi-level autorack.

Cross-brace assembly 130 may include three support braces 132, four bolting plates 134, and a gusset plate 136. Support braces 132 may refer to support brace-tubes and may be configured to couple to one or more bolting plates 134 and/or gussets 136. Example support braces 132 may be made from steel, iron, aluminum, any other suitable material, and/or any combination of the preceding. In certain embodiments, support braces 132 may comprise mounting holes for receiving bolts to couple support braces 132 to bolting plates 134 and/or gusset 136. Alternatively, or in addition to, support braces 132 may be welded to bolting plates 134 and/or gusset 136.

In an example embodiment, a first end of a support brace 132a may be coupled to a bolting plate 134a and a second end of support brace 132a may be coupled to a gusset 136. A first end of a support brace 132b may be coupled to a bolting plate 134c and a second end of support brace 132b may be coupled to a gusset 136. A first end of support brace 132c may be coupled to a bolting plate 134b, a second end of support brace 132c may be coupled to a bolting plate 134d, and a center portion of support brace 132c may be coupled to gusset 136. It will be understood that the present disclosure contemplates any suitable number and combination of support braces 132.

Bolting plates 134 may be configured to couple support braces 132 to one or more posts of an autorack 102. Example bolting plates 134 may be made of steel, iron, aluminum, any other suitable material, and/or any combination of the preceding. As illustrated, bolting plates 134 may be rectangular in shape. Alternatively, bolting plates 134 may be square, triangular, and/or any other suitable shape. In certain embodiments, bolting plates 134 may comprise mounting holes for receiving bolts to couple support braces 132 to both bolting plates 134 and posts of autorack 102.

In general, bolting plates 134 may be coupled to a post of an autorack above existing components of tri-level brace bay 214 also coupled to the post. For example, a bolting plate 134a may be coupled to a post 4 (or a post 9 (not shown)) above an existing bolting plate of a tri-level brace bay 214 and a bolting plate 134b may be coupled to post 4 (or post 9 (not shown)) above bolting plate 134a. In addition, a bolting plate 134c may be coupled to a post 3 (or a post 10 (not shown)) above another existing bolting plate of tri-level brace bay 214 and a bolting plate 134d may be coupled to post 3 (or post 10 (not shown)) above bolting plate 134c. It will be understood that the present disclosure contemplates any suitable number and combination of bolting plates 134.

Gusset plate 136 may be configured to couple support braces 132a, 132b, and 132c to one another. For example, gusset plate 136 may be bolted and/or welded to at least a portion of support brace 132a, at least a portion of support brace 132b, and at least a portion of support brace 132c. In such an example, gusset plate 136 may strengthen cross-brace assembly 130 by preventing support braces 132 (and cross-brace assembly 130) from buckling or opening up under load.

As illustrated, gusset plate 136 may be rectangular in shape. Alternatively, gusset plate 136 may be square, triangular, and/or any other suitable shape. In certain embodiments, gusset plate 136 may comprise steel, iron, aluminum, any other suitable material, and/or any combination of the preceding. It will be understood that the present disclosure contemplates any suitable number and combination of gusset plates 136.

Although FIGS. 4A through 4B illustrate cross-brace assembly 130 as including three support braces 132, four bolting plates 134, and one gusset plate 136, cross-brace assembly 130 may include any number of support braces 132, bolting plates 134, gusset plates 136, and other suitable components. Additionally, although particular examples of cross-brace assemblies 130, support braces 132, bolting plates 134, and gusset plates 136 have been described, the present disclosure contemplates any suitable cross-brace assemblies 130, support braces 132, bolting plates 134, and gusset plates 136 comprising any suitable components configured in any suitable manner. Furthermore, any component of FIGS. 4A through 4B may be separate from or integral to any other component of 4A through 4B.

FIGS. 5A through 5D illustrate side views of examples of various cross-brace assemblies of a system for reconfiguring an autorack in accordance with particular embodiments. As described above with respect to FIGS. 4A and 4B, cross-brace assemblies, such as cross-brace assemblies 510, 520, 530, and 540 of FIG. 5, are generally configured to support and stabilize at least a portion of a deck 108 of autorack 102 (such as a portion of a deck 108b of FIGS. 1A through 1F) and may facilitate reconfiguring a tri-level autorack into a bi-level autorack and/or a convertible autorack.

As illustrated in FIGS. 5A through 5D, a cross-brace assembly may be configured in any suitable manner and may include any number of support braces 132, bolting plates 134, gusset plates 136, and other suitable components. For example, a cross-brace assembly 510 may include two support braces 612 (such as support braces 512a and 512b), but not a gusset plate (such as gusset plate 136 of FIGS. 4A and 4B). In such an example, a first end of a support brace 512a may be coupled to a bolting plate 134b and a second end of support brace 512a may be coupled to a bolting plate 134c. A first end of a support brace 512b may be coupled to a bolting plate 134b and a second end of support brace 512b may be coupled to a bolting plate 134d. Alternatively, support braces 512 may be coupled directly to posts 3 and 4 or posts 9 and 10 of autorack 102, for example, by bolts and/or weld.

Similarly, a cross-brace assembly 520 may include two support braces 522 (such as support braces 522a and 522b), but not a gusset plate (such as gusset plate 136 of FIGS. 4A and 4B). In such an example, a first end of a support brace 522a may be coupled to a bolting plate 134a and a second end of support brace 522a may be coupled to a bolting plate 134d. A first end of a support brace 522b may be coupled to a bolting plate 134b and a second end of support brace 522b may be coupled to a bolting plate 134d. Alternatively, support braces 522 may be coupled directly to posts 3 and 4 or posts 9 and 10 of autorack 102, for example, by bolts and/or weld, or between other posts.

As another example, a cross-brace assembly 530 may include a shear plate 532. Shear plate 532 may be made from steel, iron, aluminum, any other suitable material, and/or any combination of the preceding. Shear plate 532 may be coupled to posts (such as posts 3 and 4 or posts 9 and 10 of autorack 102) via one or more bolt plates 134 (such as bolt plates 134a, 134b, 134c, and/or 134d of FIGS. 4A and 4B). Alternatively, shear plate 532 may be coupled directly to posts (such as posts 3 and 4 or posts 9 and 10 of autorack 102). For example, shear plate 532 may be bolted and/or welded to one or more posts of autorack 102.

As yet another example, a cross-brace assembly 540 may include three support braces 542 (such as support braces 542a, 542b, and 542c), but not a gusset plate (such as gusset plate 136 of FIGS. 4A and 4B). In such an example, a first end of a support brace 542a may be coupled to a bolting plate 134a and a second end of support brace 542a may be coupled to a bolting plate 134d. A first end of a support brace 542b may be coupled to a bolting plate 134b and a second end of support brace 542b may be coupled to a bolting plate 134c. A first end of a support brace 542c may be coupled to a bolting plate 134b and a second end of support brace 542c may be coupled to a bolting plate 134d. Alternatively, support braces 542 may be coupled directly to posts 3 and 4 or posts 9 and 10 of autorack 102, for example, by bolts and/or weld.

FIGS. 6A through 6D illustrate end and perspective views of an example of a tri-level autorack being converted into a bi-level autorack. Tri-level autorack 602 may be substantially similar to autorack 202 of FIG. 2 and/or autorack 802 of FIGS. 8A through 8C. For example, autorack 602 may include a plurality of decks 608, a door structure 610, and a plurality of side panels 618.

FIGS. 7A through 7E illustrate side and end views of an example of a bi-level autorack in accordance with certain embodiments. A bi-level autorack 702 may include a flatcar 704, a bi-level rack structure 706, a plurality of decks 708, a door structure 710, a roof 714, a plurality of bi-level brace bays 716, and a plurality of posts 1 through 12. Autorack 702 may be substantially similar to autorack 302 of FIG. 3.

Flatcar 704 may refer to the structural base of a bi-level autorack 702 and may be configured to support bi-level rack structure 706. For example, bi-level rack structure 706 may be built upon at least a portion of flatcar 704. Bi-level rack structure 706 generally includes two decks 708 and post pairs 1 through 12. In certain embodiments, flatcar may be configured to support a tri-level rack structure and/or a convertible rack structure and may include three decks (which may be automatically adjustable) and a plurality of post pairs (e.g., post pairs 1 through 12, post pairs 2 through 11). In certain embodiments, flatcar 704 may have a varying width and an hourglass shape.

Decks 708 may facilitate loading, transportation, and/or unloading of vehicles associated with autorack 702. Examples of decks 708 include an "A" deck 708a and a "B" deck 708b. "A" deck 708a may be positioned beneath "B" deck 708b. In certain embodiments, outer deck portions of "B" deck 708b may include hinge decks. A hinge deck generally may refer to an end portion of deck 708b that may be raised or lowered into various positions (such as a slanted or flat position). In such embodiments, one or more hinged deck support points may be coupled to a portion of autorack 702 located beneath a hinge deck and may be configured to support the hinge deck. In certain embodiments, "B" deck 708b may include a first half and a second half. For example, deck 708b may be split into two halves of approximately equal length. A shim plate may be used to couple the two halves together to form deck 708b.

Each deck 708 may include deck plates. Deck plates may include flat/structural steel plates, corrugated steel plates, any other suitable types of plates of any suitable material, or any combination of the preceding. In certain embodiments, deck plates may be integrated into a driving surface of decks 708. The present disclosure contemplates bi-level autorack 702 including any number and combination of decks 708 and decks 708 including any number and combination of hinge decks, deck portions, deck types, and deck plates.

In general, autorack 702 includes a plurality of posts 1 through 12. Each of posts 1 through 12 may refer to a pair of posts (e.g., post 1 may refer to posts 1a and 1b, post 2 may refer to posts 2a and 2b, post 3 may refer to posts 3a and 3b, and so on). Each pair of posts 1 through 12 includes a first post (e.g., a post 1a as illustrated in FIGS. 7A, 7B, 7D, and 7E) located near a first side of autorack 702 and a second post (e.g., a post 1b as illustrated in FIGS. 7A, 7B, 7D, and 7E) located near a second side of autorack 702 opposite the first side. In certain embodiments, autorack 702 may not include posts 1 and 12.

Figure 7A:
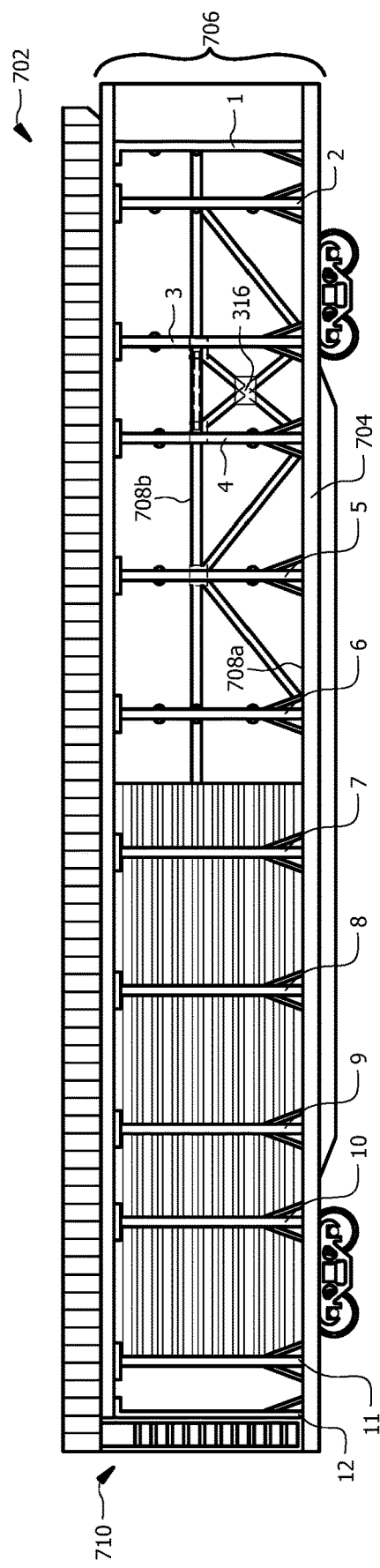
FIGS. 7A through 7E illustrate side and end views of an example of a bi-level autorack in accordance with certain embodiments.
Figure 7B:
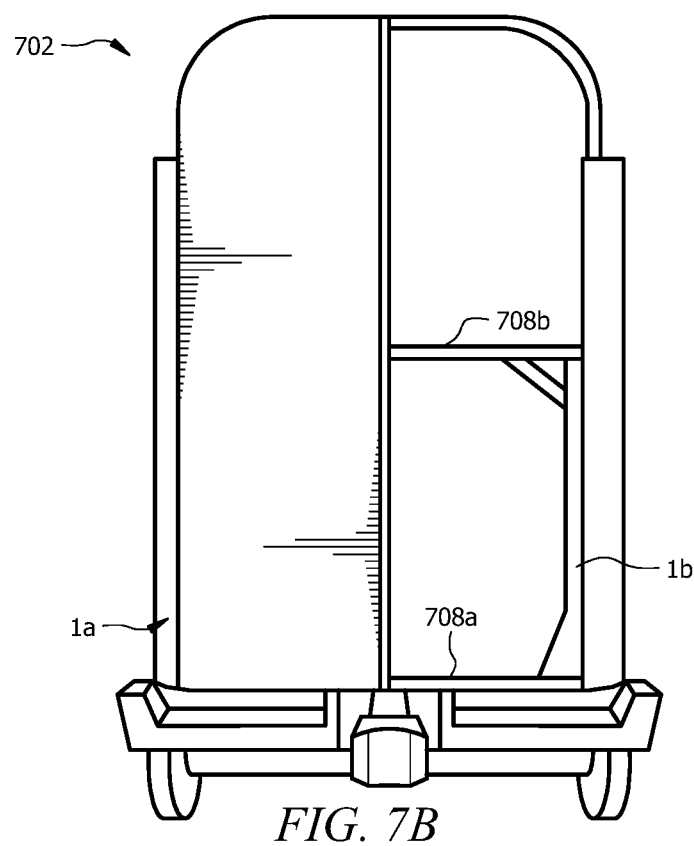
Figure 7C:
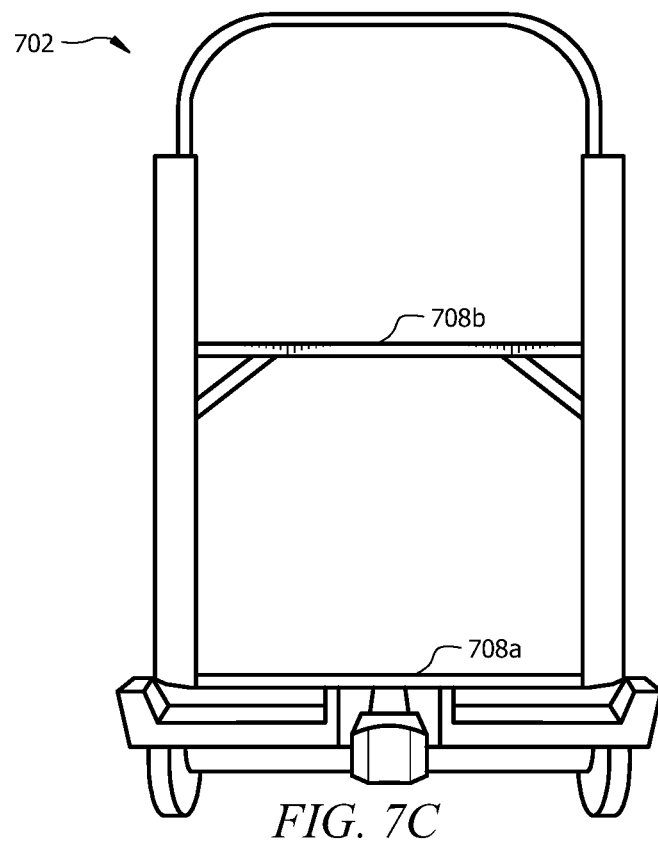
Figure 7D:
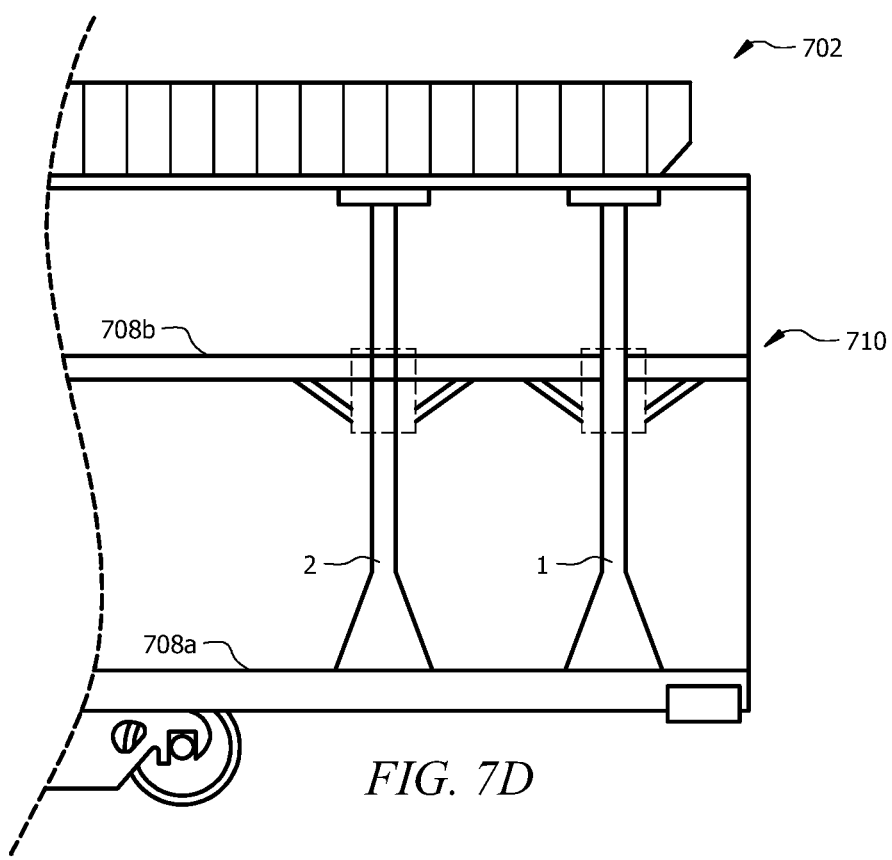
Figure 7E:
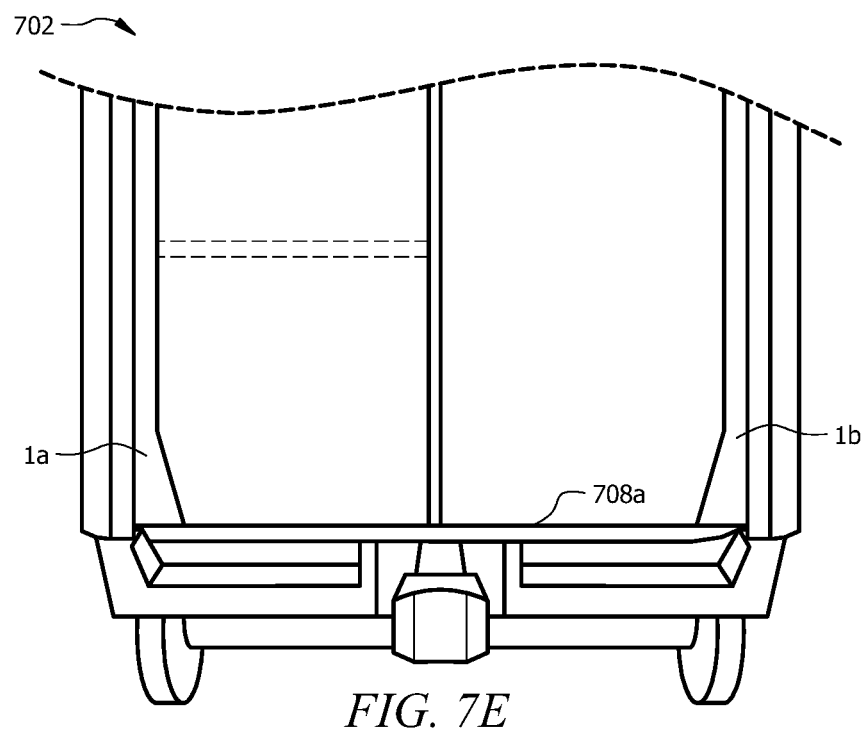

Examples of posts 1 through 12 include straight posts, dog-leg posts, any other suitable type of posts, or any combination thereof. As illustrated in FIGS. 7B, 7D, and 7E, posts 1a and 1b may be dog-leg posts. In alternative embodiments, posts 1a and 1b may be straight posts, telescopic posts, or any other suitable type or shape of posts. In certain embodiments, autorack 702 may not include posts 1a, 1b, 12a, and 12b.

In certain embodiments, the minimum width between a pair of posts (e.g., the minimum width between posts 1a and 1b) may be eight feet and seven inches (8'-7"). For example, the width between posts 1a and 1b may be eight feet and eight inches (8'-8") or any other suitable width. Further, the distance between post 1 and a door structure 710 of autorack 702 may be two feet and seven inches (2'-7") and the distance between post 1 and post 2 may be three feet and five inches (3'-5"). It should be understood that the present disclosure contemplates any suitable width and any suitable distance between posts and door structures of autorack 702.

Although FIGS. 7A through 7E illustrate autoracks 702 as including a particular number of flatcars 704, racks 706, decks 708, door structures 710, and posts 1 through 12, autoracks 702 may include any number of flatcars 704, racks 706, decks 708, door structures 710, posts 1 through 12, and other suitable components. Additionally, although particular examples of autorack 702, flatcars 704, racks 706, decks 708, door structures 710, and posts 1 through 12 have been described, the present disclosure contemplates any suitable autorack 702, flatcars 704, racks 706, decks 708, door structures 710, and posts 1 through 12 comprising any suitable components configured in any suitable manner. For example, autorack 702 may be a convertible autorack with three-adjustable decks and configured to convert between a bi-level configuration and a tri-level configuration, as described in more detail below with respect to FIGS. 10A and 10B. As another example, autorack 702 may have an adjustable roof height, as described in more detail below with respect to FIGS. 10A and 10B. As yet another example, autorack 702 may have a varying width and an hourglass shape, as illustrated in FIG. 9. In addition, any component of FIGS. 7A through 7E may be separate from or integral to any other component of FIGS. 7A through 7E.

FIGS. 8A through 8E illustrate side and end views of an example of a conventional tri-level autorack in accordance with certain embodiments. Autorack 802 may include a flatcar 804, a tri-level rack structure 806, a plurality of hinged deck support points 807, a plurality of decks 808, a door structure 810, and a plurality of posts 1 through 12. Autorack 802 may be substantially similar to autorack 202 of FIG. 2 and/or autorack 602 of FIGS. 6A through 6D.

Flatcar 804 may refer to the structural base of a tri-level autorack 802 and may be configured to support tri-level rack structure 806. For example, tri-level rack structure 806 may be built upon at least a portion of flatcar 804. Tri-level rack structure 806 of tri-level autorack 802 generally includes three decks 808 and post pairs 1 through 12.

Decks 808 may facilitate loading, transportation, and/or unloading of vehicles associated with autorack 802. Examples of decks 808 include an "A" deck 808a, a "B" deck 808b, and a "C" deck 808c. "A" deck 808a may be positioned beneath "B" deck 808b, and "B" deck 808b may be positioned beneath "C" deck 808c. Decks 808 may include deck plates. In certain embodiments, outer deck portions of "B" deck 808b may include hinge decks. A hinge deck generally may refer to an end portion of deck 808b that may be raised or lowered into various positions (such as a slanted or flat position). In such embodiments, one or more hinged deck support points 807 may be coupled to a portion of autorack 802 located beneath a hinge deck and may be configured to support the hinge deck. In some embodiments, "C" deck 808c may include hinge decks.

Each deck 808 may include deck plates. Deck plates may include flat/structural steel plates, corrugated steel plates, any other suitable types of plates of any suitable material, or any combination of the preceding. In certain embodiments, deck plates may be integrated into a driving surface of decks 808. The present disclosure contemplates autorack 802 including any number and combination of decks 808 and decks 808 including any number and combination of hinge decks, deck portions, deck types, and deck plates.

Figure 8A:
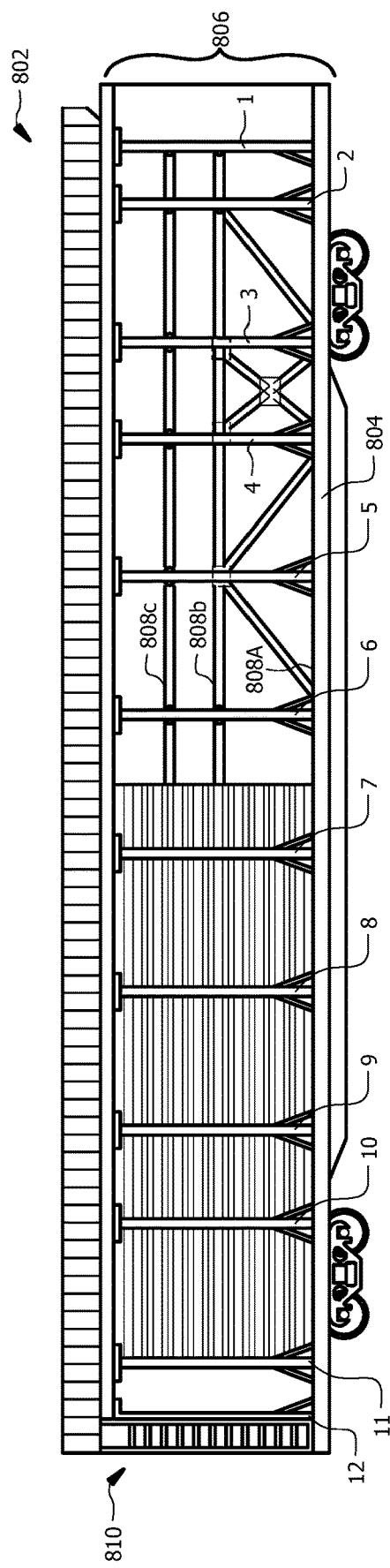
FIGS. 8A through 8E illustrate side and end views of an example of a conventional tri-level autorack in accordance with certain embodiments.
Figure 8B:
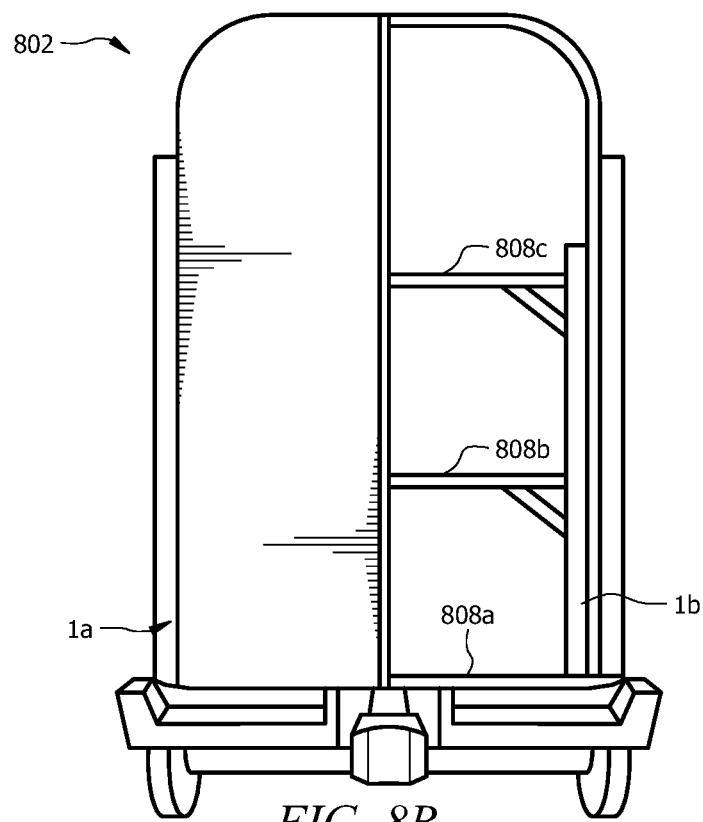
Figure 8C:
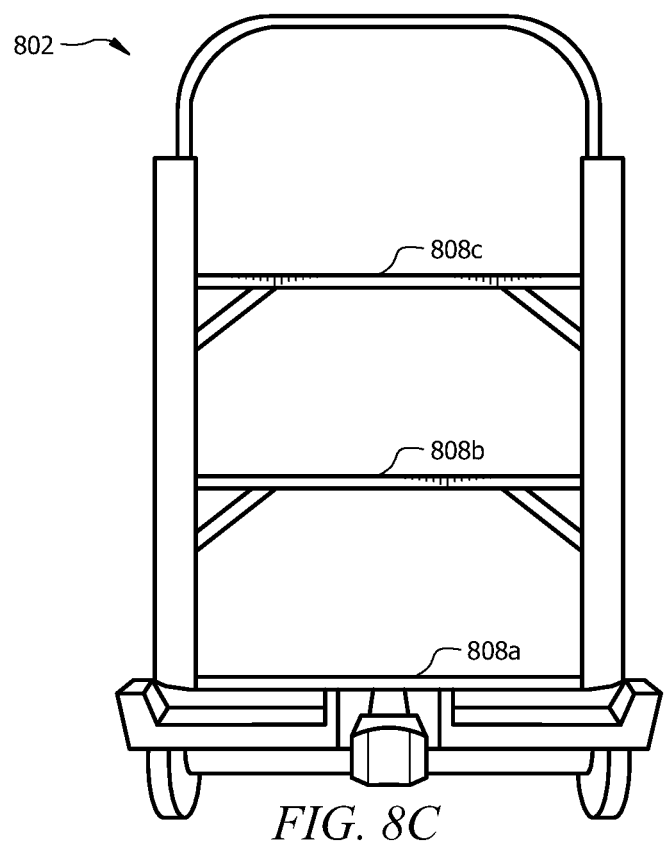
Figure 8D:
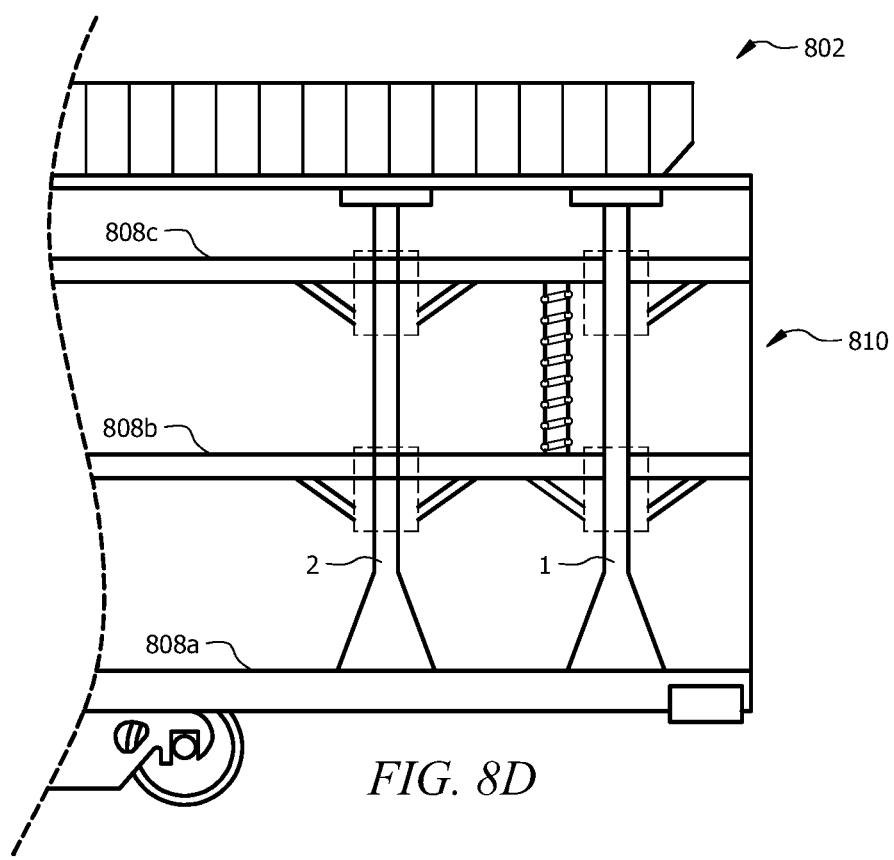
Figure 8E:
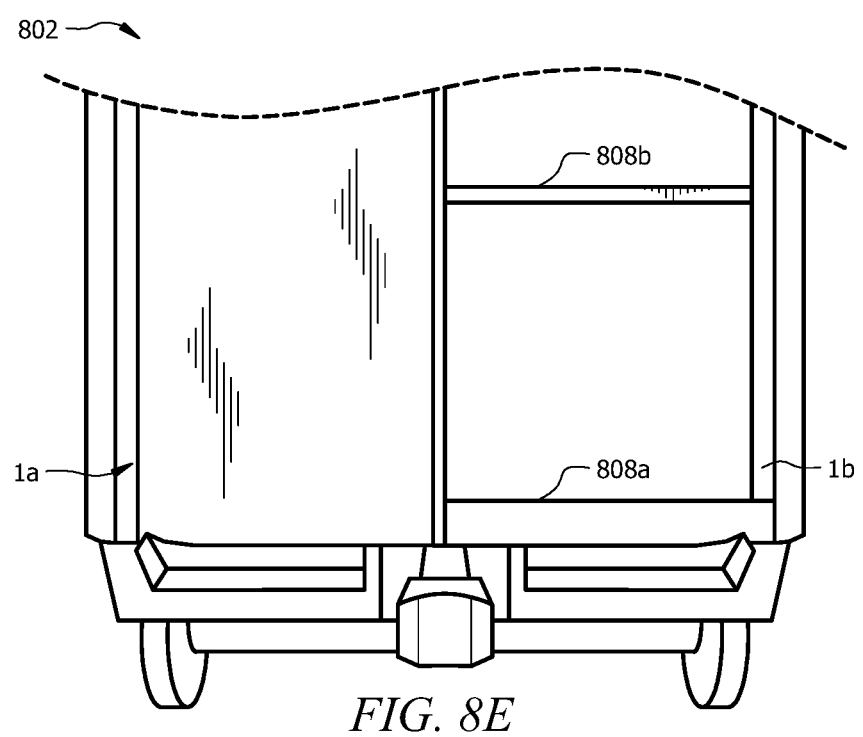

In general, autorack 802 may include a plurality of posts (such as posts 1 through 12). Each of posts 1 through 12 may refer to a pair of posts (e.g., post 1 may refer to posts 1a and 1b, post 2 may refer to posts 2a and 2b, post 3 may refer to posts 3a and 3b, and so on). Each pair of posts 1 through 12 includes a first post (e.g., a post 1a as illustrated in FIGS. 8B, 8D, and 8E) located near a first side of autorack 802 and a second post (e.g., a post 1b as illustrated in FIGS. 8B, 8D, and 8E) located near a second side of autorack 802 opposite the first side.

Examples of posts 1 through 12 include straight posts, dog-leg posts, any other suitable type of posts, or any combination thereof. As illustrated in FIGS. 8B, 8D, and 8E, posts 1a and 1b may be straight posts. In alternative embodiments, posts 1a and 1b may be dog-leg posts or any other suitable type or shape of posts.

In certain embodiments, the minimum width between a pair of posts (e.g., the minimum width between posts 1a and 1b) may be eight feet and three inches (8'-3"). For example, the width between posts 1a and 1b may be eight feet and four inches (8'-4") or any other suitable width. Further, the distance between post 1 and a door structure 810 of autorack 802 may be two feet and four inches (2'-4") and the distance between post 1 and post 2 may be three feet and eight inches (3'-8"). It should be understood that the present disclosure contemplates any suitable width and any suitable distance between posts and door structures of autorack 102.

According to the present disclosure, autorack 802 may be converted into a bi-level autorack (such as an autorack 102 of FIGS. 1A through 1F or an autorack 702 of FIGS. 7A through 7E) or a convertible autorack (such as an autorack 1002 of FIG. 10A), for example, as part of an autorack recertification process. As described above, reconfiguring autorack 802 into a bi-level autorack generally includes removing decks 808b and 808c from autorack 802, coupling a cross-brace assembly 130 to posts above each existing tri-level brace bays, and reinstalling deck 808b above or below cross-brace assemblies 130 or replacing deck 808b with a new deck and installing the new deck above or below cross-brace assemblies 130. In certain embodiments, reconfiguring autorack 802 into a bi-level autorack also may include increasing the width between a pair of posts, the distance between different pairs of posts, and/or removing pairs of posts. For example, the width between posts 1a and 1b of autorack 802 may be increased to a minimum of eight feet and seven inches (8'-7"). To do so, posts 1a and 1b may be moved closer to a respective edge of autorack 802. As another example, posts 1a, 1b, 12a, and 12b may be removed from autorack 802. It should be understood that the present disclosure contemplates increasing the width between, increasing the distance between, and/or removing any suitable number and combination of posts.

As described in more detail below with respect to FIGS. 10A and 10B, reconfiguring autorack 802 into a convertible autorack generally includes removing decks 808b and 808c from autorack 802, coupling a cross-brace assembly 130 to two or more posts at a location above each existing tri-level brace bays, installing a deck adjustment system, installing additional deck connection plates to accommodate various deck attachment locations, installing, relocating, and/or removing hinge deck support points, and reinstalling decks 808b and/or 808c above or below cross-brace assemblies 130 or replacing each of decks 808b and/or 808c with a new deck and installing the new decks above or below cross-brace assemblies 130.

In certain embodiments, transforming autorack 802 into a convertible autorack also may include replacing a pair of posts, increasing the width between a pair of posts, modifying the distance between different pairs of posts, and/or removing pairs of posts. For example, the width between posts 1a and 1b of autorack 802 may be increased to a minimum of eight feet and seven inches (8'7"). To do so, posts 1a and 1b may be moved closer to a respective edge of autorack 802. As another example, posts 1a, 1b, 12a, and 12b may be removed from autorack 802. It should be understood that the present disclosure contemplates increasing the width between, increasing the distance between, and/or removing any suitable number and combination of posts.

In general, the conversion process may include any of the following steps: (1) blasting the interior and/or exterior of the autorack to remove corrosion; (2) repainting the interior and/or exterior of the autorack; (3) replacing and/or reconfiguring the flatcar and/or "A" deck (e.g., replacing an existing flatcar with an hourglass-shaped flatcar); (4) replacing an existing vehicle restraint system (e.g., replacing a tri-level vehicle restraint system (such as wheel chocks that attach to and are cantilevered over a bar attached to the deck adjacent to a driving surface of a deck of an autorack) with a bi-level vehicle restraint system (such as wheel chocks that attach to steel wire grating panels fastened to the driving surface of a deck of an autorack) or a universal vehicle restraint system for convertible autoracks); (5) replacing an existing door structure (e.g., replacing a conventional door structure with an updated door structure (such as a seal safe radial door (SSRD) structure), exchanging entry doors with taller, wider, shorter, or telescoping doors, and/or adding or removing a set of door panels from the existing entry doors); (6) removing, replacing, and/or reconfiguring one or more posts (e.g., increasing the width between posts on opposing sides of the autorack, relocating posts, etc.); (7) installing a securement system on the autorack; (8) adding, removing, replacing, and/or reconfiguring one or more side panels of the autorack (e.g., replacing existing side screens with taller, shorter, or telescoping side screens); (9) adding, removing, replacing, and/or reconfiguring one or more roof sheets of the autorack (e.g., to accommodate a new door structure, an increased autorack height, an increased width of an autorack, etc.); (10) removing, replacing, and/or reconfiguring an existing roof assembly (e.g., reconfiguring the roof assembly for a new door structure (such as a door structure with upper canopies) and/or increased autorack height, removing the roof assembly for re-coating, etc.); (11) adding, removing, replacing, and/or reconfiguring connection plates for application of decks at new and/or adjustable heights; (12) adding, removing, and/or relocating hinged deck support points (e.g., removing existing hinged deck support points 807 coupled to posts 2 and 3 below deck 808b); (13) installing a deck adjustment system to enable the height of one or more decks of an autorack to be adjusted; (14) installing a roof adjustment system to enable the height of the roof of an autorack to be adjusted (e.g., from 19' to approximately 20'2" and vice versa); (15) replacing and/or reconfiguring a side ladder assembly to accommodate an increased autorack height; (16) installing a magnetic door guard assembly; (17) any other suitable modification, replacement, or addition; and/or (18) any combination of the proceeding. It should be understood that any of the preceding may occur in any suitable order and in any suitable manner. In certain embodiments, after the conversion process, any necessary components are replaced and/or repaired, and the autorack is repainted and re-decaled, the autorack may be recertified.

Although FIGS. 8A through 8E illustrate autoracks 802 as including certain flatcars 804, racks 806, hinged deck support points 807, decks 808, door structures 810, and posts 1 through 12, autoracks 802 may include any number of flatcars 804, racks 806, hinged deck support points 807, decks 808, door structures 810, posts 1 through 12, and other suitable components. Additionally, although particular examples of autorack 802, flatcars 804, racks 806, hinged deck support points 807, decks 808, door structures 810, and posts 1 through 12 have been described, the present disclosure contemplates any suitable autorack 802, flatcars 804, racks 806, hinged deck support points 807, decks 808, door structures 810, and posts 1 through 12 comprising any suitable components configured in any suitable manner. In addition, any component of FIGS. 8A through 8E may be separate from or integral to any other component of FIGS. 8A through 8E. Furthermore, although certain examples of reconfiguring autorack 802 into a bi-level autorack or a convertible autorack have been described, it should be understood that the present disclosure contemplates reconfiguring autorack 802 into any suitable type of autorack in any suitable manner.

FIG. 9 illustrates a top view of an example autorack 902 in accordance with certain embodiments. Autorack 902 may have ends 914 and longitudinal sides 916 and include variable widths along its longitudinal length. In general, autorack 902 has an hourglass shape with a minimum width 920 at the center of autorack 902 and a width that expands over the distance 930 to a maximum width 922. The maximum width 922 may continue out to distance 932 and then reduce to end width 924 at distance 934. As illustrated, particular embodiments of the present disclosure may provide more width than a conventional autorack railcar (represented by dashed lines 918) at particular locations along the length of autorack 920. The additional width may provide additional room for crew members to operate and may reduce the chances of vehicle damage.

In certain embodiments, autorack 902 may comprise a 90' railcar. In such an embodiment, minimum width 920 may be approximately 9' 11". The width of autorack 902 may gradually increase over distance 930 (e.g., approximately 18' from center) to maximum width 922. Maximum width 922 may be approximately 10' 8". The width of autorack 920 may be a constant 10' 8" between distance 930 (e.g., approximately 18' from center) and distance 932 (e.g., approximately 43' from center). The width at the end of autorack 920 may gradually reduce between distance 932 (e.g., approximately 43' from center) and 934 (e.g., approximately 45' from center) to end width 924. In this embodiment, end width 924 may approximately 10' 3.8".

According to the present disclosure, autorack 902 may have been reconfigured from a bi-level autorack, a tri-level autorack, or a convertible autorack to autorack 902 having variable width (e.g., an hourglass shape). Reconfiguring an autorack into a variable width autorack (e.g., an hourglass-shaped autorack), such as autorack 902, may comprise any of the steps described about with respect to FIGS. 1A through 8E. Reconfiguring an autorack into an hour-glass shaped autorack 902 may further include: (1) replacing the existing flatcar with a flatcar having a varying width; (2) adding extensions to a flatcar for post support to provide an additional width of approximately 8" to approximately 9"; (3) reconfiguring or replacing the roof rail, roof end section, roof sheets, and/or roof assembly of an autorack to accommodate for the increased width of autorack 902; (4) reconfiguring or replacing an existing door structure (e.g., replacing a conventional door structure with an updated door structure (such as a seal safe radial door (SSRD) structure), exchanging entry doors with wider doors, and/or adding or removing a set of door panels from existing entry doors); (5) removing, replacing, and/or reconfiguring one or more posts (e.g., increasing the width between posts on opposing sides of the autorack to provide additional width, relocating posts, etc.); (6) removing, replacing, and/or reconfiguring one or more side panels of the autorack to accommodate an increased width (e.g., replacing one or more side panels straight panels, angled panels, curved panels, or any combination thereof); (7) replacing or reconfiguring deck connection closure plates and/or adding extensions to the deck connection plates to the posts to accommodate a wider width; (8) any other suitable modification, replacement, or addition; and/or (9) any combination of the proceeding. It should be understood that any of the preceding may occur in any suitable order and in any suitable manner. In certain embodiments, after the conversion process, any necessary components are replaced and/or repaired, and the autorack is repainted and re-decaled, the autorack may be recertified.

Although FIG. 9 illustrates autoracks 902 as having particular configurations and dimensions, autoracks 902 may include any suitable configurations and dimensions. Additionally, although particular examples of autoracks 902 have been described, the present disclosure contemplates any suitable autoracks 902 comprising any suitable components configured in any suitable manner. Moreover, any component of FIG. 9 may be separate from or integral to any other component of FIG. 9 and may include any feature and any component of FIGS. 1A through 8E.

Figure 10B:
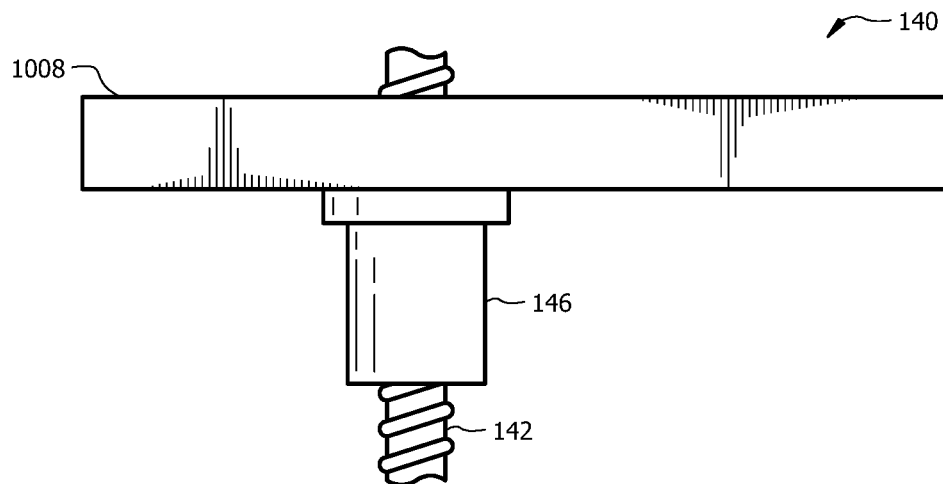

FIGS. 10A and 10B illustrate side views of an example autorack 1002 in accordance with certain embodiments. As illustrated in FIG. 10A, an autorack 1002 may be a convertible autorack and may include repositionable decks 1008, such as decks 1008b and 1008c. Autorack 1002 may be configured or reconfigured for different vehicles by adjusting the vertical position of decks 1008b and/or 1008c, by reconfiguring autorack 1002 between a tri-level autorack and a bi-level autorack, by increasing the overall height of autorack 1002, and/or any combination of the proceeding. In certain embodiments, autorack 1002 may include magnetically coupled door edge guards to support various configurations of autorack 1002.

According to certain embodiments, the vertical position of decks 1008b and 1008c of autorack 1002 may be adjusted without disassembling portions of autorack 1002. Each of decks 1008b and 1008c may be raised or lowered within autorack 1002 to accommodate various types of vehicles to be transported on autorack 1002. For example, the height of deck 1008b and deck 1008c may be adjusted by incremental amounts (e.g., three inches) using an adjustment system. In certain embodiments, a deck 1008b or 1008c may be "unlocked" (e.g., unbolted or mechanically uncoupled) from a side structure of autorack 1002, repositioned to a new position, and "re-locked" (e.g., bolted or mechanically coupled) to the side structure of autorack 1002. Decks 1008b or 1008c may be supported and/or repositioned using any suitable technique, such as cranes, hoists, jacks, chain/cable hoists, hydraulic or air cylinders, and/or levers.

As shown in FIG. 10B, an adjustment system of autorack 1002 may be a ball screw system 140 that includes ball screws 142, ball screw actuators 144, a travelling nut 146, and a controller 148. A ball screw actuator 144 may be coupled to a section of a roof of autorack 1002 and may be controlled by controller 148. Controller 148 may be operably coupled to ball screw actuator 144 and configured to communicate electrical signals for positioning decks 1008b and 1008c. A ball screw 142 may be operably coupled to ball screw actuator 144 and configured to be rotated by ball screw actuator 144 via a gear reduction mechanism and an electric motor, or any other suitable rotational system. A traveling nut 146 may be operably coupled to a deck 1008b or deck 1008c and ball screw 142 and configured to traverse along ball screw 142 when ball screw 142 is rotated. By using ball screw 142 and traveling nut 146, deck 1008b or deck 1008c may be moved up and down along the length of ball screw 142. Although FIGS. 10A and 10B illustrates autorack 1002 as including a particular number of ball screws 142, ball screw actuators 144, travelling nuts 146, and controllers 148, autorack 1002 may include any number of ball screws 142, ball screw actuators 144, travelling nuts 146, and controllers 148, and other suitable components. Additionally, although particular examples of adjustment systems have been described, the present disclosure contemplates any suitable adjustment systems comprising any suitable components configured in any suitable manner.

For example, an adjustment system may include one or more pulleys and one or more tension elements. Tension elements may be any element operable in conjunction with pulleys (e.g., strings, ropes, tethers, cables, etc.). By increasing the tension in tension elements (e.g., by pulling on tension elements), the vertical position of a deck 1008*b* and/or deck 1008*c* may be adjusted. The tension on tension elements may be increased by operating buttons of a controller, which in turn operate an actuator (e.g., a motor) that pulls and/or releases tension elements to increase and/or decrease tension on the tension elements.

In certain embodiments, one or more fasteners may be utilized to couple a deck (e.g., a deck 1008*b* or a deck 1008*c*) to a sidewall of autorack 1002. Fasteners may lock and unlock decks 1008*b* and 1008*c* from the sidewall of autorack 1002. When decks 1008*b* and 1008*c* are locked to the sidewall of autorack 1002 by the fasteners, the fasteners may prevent adjustment of the vertical position of each deck within autorack 1002.

In certain embodiments, autorack 1002 may be reconfigured between a tri-level and a bi-level autorack. Reconfiguring autorack 1002 between a tri-level and a bi-level may include: (1) removing deck 1008*b* or deck 1008*c* from autorack 1002; (2) reinstalling deck 1008*b* or deck 1008*c* within autorack 1002; (3) lowering deck 1008*b* onto deck 1008*a* such that at least a portion of deck 1008*b* is substantially flush with a top surface of deck 1008*a* (e.g., portions of deck 1008*a* and 1008*b* are combined to form a single deck for which vehicles can be loaded); (4) any other suitable method; and/or (5) any combination thereof.

Autorack 1002 may be an autorack with an adjustable height and may include an adjustable side screen assembly. In such embodiments, a roof 1014 may be coupled to autorack 1002 using posts (such as posts 1 through 12 of FIG. 1) that are telescopic posts configured to extend to accommodate an increased height of roof 1014. A height of roof 1014 may be increased or decreased using any suitable technique, such as a hoist, crane, jack, cylinders, chain/cable hoist, gears, air bags, levers, and/or any combination of the proceeding.

In certain embodiments, the height of roof 1014 is adjusted using a ball screw system 140 that includes ball screws 142, ball screw actuators 144, a travelling nut 146, and a controller 148. A ball screw actuator 144 may be coupled to a section of a roof of autorack 1002 and may be controlled by controller 148. Controller 148 may be operably coupled to ball screw actuator 144 and configured to communicate electrical signals for positioning roof 1014. A ball screw 142 may be operably coupled to ball screw actuator 144 and configured to be rotated by ball screw actuator 144 via a gear reduction mechanism and an electric motor, or any other suitable rotational system. A traveling nut 146 may be coupled to ball screw 142 and deck 1008*b*, deck 1008*c*, or another structure of autorack 1002 and configured to traverse along ball screw 142 when ball screw 142 is rotated. By using ball screw 142 and traveling nut 146, roof 1014 may be raised or lowered when ball screw 142 is turned and telescoping posts are unfastened. In certain embodiments, roof 1014 is extended by adding roof panels to roof 1014. Such roof panels may be telescoping roof panels that extend downwards towards autorack 1002.

While particular examples of adjustment systems and roof panels have been described, the present disclosure contemplates any suitable adjustment systems and roof panels comprising any suitable components configured in any suitable manner.

For example, an adjustment system may include one or more pulleys and one or more tension elements. Tension elements may be any element operable in conjunction with pulleys (e.g., strings, ropes, tethers, cables, etc.). By increasing the tension in tension elements (e.g., by pulling on tension elements), the height of roof 1014 may be adjusted. The tension on tension elements may be increased by operating buttons of a controller, which in turn operate an actuator (e.g., a motor) that pulls and/or releases tension elements to increase and/or decrease tension on the tension elements.

In certain embodiments, one or more fasteners may be utilized to couple a telescopic side screen and/or a telescopic post of autorack 1002 to at a desired position. Fasteners may lock a side screen and/or a telescopic post at a particular length and unlock a side screen and/or a telescopic post from a particular length to allow the length to be adjusted. When a side screen and/or a telescopic post is locked at a particular length by the fasteners, the fasteners may prevent adjustment of the vertical position of roof 1014.

To accommodate for an increased height of roof 1014 (e.g. from 19' to approximately 20'2"), an existing door structure of autorack 1002 may be replaced or reconfigured (e.g., exchanging entry doors with taller doors and/or telescoping doors, adding a set of door panels to the existing entry doors, etc.). In addition, sides screens of autorack 1002 may be added or extended to enclose the interior of autorack 102. The height of side screens may be extended by adding an additional set of side screens, replacing the existing side screens with taller side screens, or replacing the existing side screens with two sets of side screens that overlap such that they slip past each other when adjusting the height of roof 1014.

In certain embodiments, autorack 1002 may be a recertified autorack and may have been reconfigured from a tri-level autorack (e.g., a railcar comprising three decks) or a bi-level autorack (e.g., a railcar comprising two decks) to a convertible autorack (e.g., a railcar that may be configured as a bi-level and a tri-level autorack by removing and adding a deck). The reconfiguration process may comprise any of the steps described above, including any steps described with respect to FIGS. 1A through 9.

According to the present disclosure, any of the following steps may be performed during the reconfiguration and/or recertification process: (1) one or more cross-brace assemblies may be installed above one or more existing tri-level brace bays and one or more hinged deck support points may be removed (e.g., one or more hinged deck support points may be decoupled from one or more posts); (2) one or more decks may be added, removed, reconfigured, and/or replaced (e.g., an existing deck may be replaced by a nesting deck configured to adjust in length); (3) a vehicle restraint system of an autorack may be replaced (e.g., a tri-level vehicle restraint system (such as wheel chocks that attach to and are cantilevered over a bar attached to the deck adjacent to a driving surface of a deck of an autorack) may be replaced with a bi-level vehicle restraint system (such as wheel chocks that attach to steel wire grating panels fastened to the driving surface of a deck of an autorack) or replaced with a universal vehicle restraint system that may be used for both bi-level and tri-level configurations); (4) a door structure of an autorack may be replaced and/or reconfigured (e.g., a conventional door structure may be replaced by a seal safe radial door (SSRD) structure, entry doors may be exchanged with taller or shorter doors or doors having telescoping panels, and/or a set of door panels may be added to or removed from the existing entry doors); (5) a securement system may be installed on an autorack; (6) one or more posts of an autorack may be removed, replaced, and/or reconfigured (e.g., the width between posts on opposing sides of an autorack may be increased, the height of posts may be increased, the posts may be replaced with telescoping posts configured to increase in height when the height of the roof is increased); (7) one or more side panels of an autorack may be reconfigured, removed, and/or replaced (e.g., the existing side screens may be exchanged for taller or shorter side screens, telescoping side screens, etc.); (8) one or more roof sheets, rails, or other roof structures of an autorack may be added, reconfigured, removed, and/or replaced (e.g., to accommodate an increased height of an autorack); (9) a deck adjustment system may be installed to enable the height of one or more decks of an autorack to be adjusted; (10) a roof adjustment system may be installed to enable the height of the roof of an autorack to be adjusted (e.g., from 19' to approximately 20' 2"); (11) one or more posts and deck connection plates may be reconfigured for quick deck attachment and detachment and to accommodate various deck placement locations; (12) a side ladder assembly may be reconfigured or replaced to accommodate an increased height; (13) the interior and/or exterior of an autorack may be blasted to remove corrosion and/or repainted; (14) a deck adjustment system may be installed to enable the height of one or more decks of an autorack to be adjusted; (15) a roof adjustment system may be installed to enable the height of the roof of an autorack to be adjusted (e.g., from 19' to approximately 20'2" and vice versa); (16) a side ladder assembly may be replaced and/or reconfigured to accommodate an increased autorack height; (17) a magnetic door guard assembly may be installed; (18) any other suitable modification or addition; and/or (19) any combination of the proceeding.

Although FIGS. 10A and 10B illustrate autoracks 1002 as including a particular number of flatcars 1004, racks 1006, decks 1008, door structures 1010, roofs 1014, and adjustment systems, autoracks 1002 may include any number of flatcars 1004, racks 1006, decks 1008, door structures 1010, roofs 1014, adjustment systems, and other suitable components. Additionally, although particular examples of autoracks 1002, flatcars 1004, racks 1006, decks 1008, door structures 1010, roofs 1014, and adjustment systems have been described, the present disclosure contemplates any suitable autoracks 1002, flatcars 1004, racks 1006, decks 1008, door structures 1010, roofs 1014, and adjustment systems comprising any suitable components configured in any suitable manner. Moreover, any component of FIGS. 10A and 10B may be separate from or integral to any other component of FIGS. 10A and 10B and may include any suitable features and components of FIGS. 1A through 9.

Figure 11:
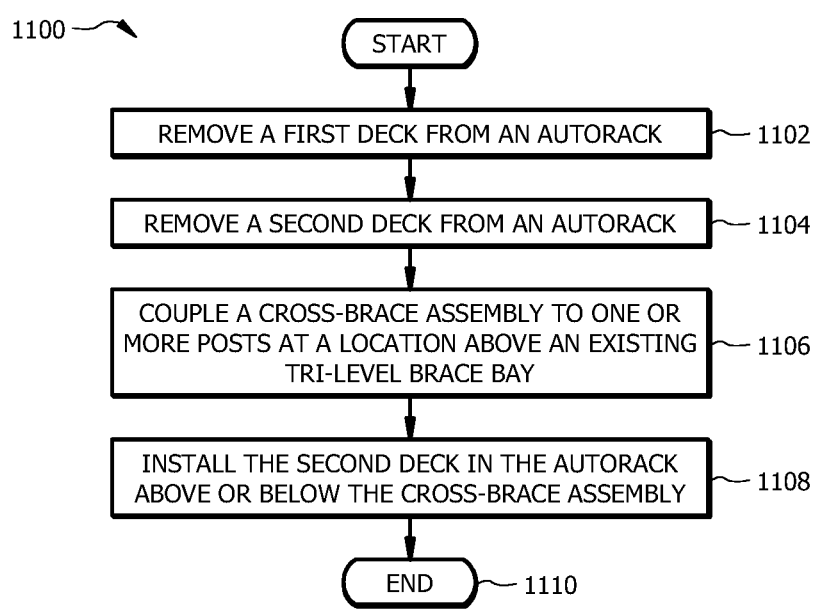
FIG. 11 illustrates an example of a method for reconfiguring an autorack in accordance with particular embodiments.

FIG. 11 illustrates an example of a method for reconfiguring an autorack in accordance with particular embodiments. Method 1100 begins at step 1102, where a first deck of an autorack, such as a deck 208c of an autorack 202 or a deck 808c of an autorack 802, is removed. To remove a deck 208c or a deck 808c, the method may first split deck 208c or deck 808c into two halves (e.g., by splitting deck 208c or deck 808c in the middle, which include removing a shim connecting a first half of the deck to a second half of the deck) such that (1) it may be easier to remove deck 208c or deck 808c, and (2) a greater portion of deck 208c or deck 808c may be preserved during the removal, thereby reducing the cost of the reconfiguration and/or recertification process. Alternatively, the method may remove deck 208c or deck 808c in any suitable manner.

At step 1104, a second deck of an autorack, such as a deck 208b of an autorack 202 or a deck 808b of an autorack 802, is removed. To remove a deck 208b or a deck 808b, the method may first split deck 208b or deck 808b into two halves (e.g., by splitting deck 208b or deck 808b in the middle) such that (1) it may be easier to remove deck 208b or deck 808b, and (2) a greater portion of deck 208b or deck 808b may be preserved during the removal, thereby reducing the cost of the reconfiguration and/or recertification process. Alternatively, the method may remove deck 208b or deck 808b in any suitable manner.

The method may proceed to step 1106 where at least one cross-brace assembly 130 is coupled to one or more of posts, such as posts 3 and 4 or posts 9 and 10) at a location above an existing tri-level brace bay assembly 214. For example, a bolting plate 134a of a cross-brace assembly 130 may be coupled to a post 4 (or a post 9 (not shown)) of an autorack 202 or 802 above an existing bolting plate of a tri-level brace bay 214 and a bolting plate 134b of cross-brace assembly 130 may be coupled to post 4 (or post 9 (not shown)) above bolting plate 134a of cross-brace assembly 130. In addition, a bolting plate 134c of cross-brace assembly 130 may be coupled to a post 3 (or a post 10 (not shown)) of autorack 202 or autorack 802 above another existing bolting plate of tri-level brace bay 214 and a bolting plate 134d of cross-brace assembly 130 may be coupled to post 3 (or post 10 (not shown)) above bolting plate 134c of cross-brace assembly 130. The method may couple bolting plates 134 to respective posts of autorack 202 or autorack 802 in any suitable order and in any suitable manner. For example, each bolting plate 134 may be welded and/or bolted to a respective post of autorack 202 or autorack 802.

Next, a first end of a support brace 132a of cross-brace assembly 130 may be coupled to bolting plate 134a and a second end of support brace 132a may be coupled to a gusset 136 of cross-brace assembly 130. A first end of a support brace 132b of cross-brace assembly 130 may be coupled to bolting plate 134c and a second end of support brace 132b may be coupled gusset 136. A first end of a support brace 132c of cross-brace assembly 130 may be coupled to bolting plate 134b, a second end of support brace 132c may be coupled to bolting plate 134d, and a center portion of support brace 132c may be coupled to gusset 136. The method may then proceed to step 1108.

At step 1108, the second deck of the autorack, such as a deck 208b of an autorack 202 or a deck 808b of an autorack 802, is installed in the autorack above or below the one or more cross-brace assemblies 130. In alternative embodiments, deck 208b or deck 808b may be replaced with a new deck and the new deck may be installed above or below cross-brace assemblies 130. In certain embodiments, installing deck 208b or deck 808b may include installing a first half of deck 208b or deck 808b in the autorack, installing a second half of deck 208b or deck 808b in the autorack, and coupling the first half of deck 208b or deck 808b to the second half of deck 208b or deck 808b using a shim plate.

In certain embodiments, before, in parallel, or after step 1106 and/or step 1108, the method may increase the width between a pair of posts, increase the distance between different pairs of posts, and/or remove one or more pairs of posts. For example, the width between posts 1a and 1b of autorack 802 may be increased to a minimum of eight feet and seven inches (8'-7"). To do so, posts 1a and 1b may be moved closer to a respective edge of autorack 802. As another example, posts 1*a*, 1*b*, 12*a*, and 12*b* may be removed from autorack 802.

In certain embodiments, any of the following additional steps may be performed in any suitable order: (1) blasting the interior and/or exterior of the autorack to remove corrosion; (2) repainting the interior and/or exterior of the autorack; (3) replacing the flatcar and/or "A" deck (e.g., replacing an existing flatcar with an hourglass-shaped flatcar); (4) replacing an existing vehicle restraint system (e.g., replacing a tri-level vehicle restraint system (such as wheel chocks that attach to and are cantilevered over a bar attached to the deck adjacent to a driving surface of a deck of an autorack) with a bi-level vehicle restraint system (such as wheel chocks that attach to steel wire grating panels fastened to the driving surface of a deck of an autorack) or a universal vehicle restraint system for convertible autoracks); (5) replacing an existing door structure (e.g., replacing a conventional door structure with an updated door structure (such as a seal safe radial door (SSRD) structure), exchanging entry doors with taller, wider, shorter, or telescoping doors, and/or adding or removing a set of door panels from the existing entry doors); (6) removing, replacing, and/or reconfiguring one or more posts (e.g., increasing the width between posts on opposing sides of the autorack, relocating posts, etc.); (7) installing a securement system on the autorack; (8) removing, replacing, and/or reconfiguring one or more side panels of the autorack (e.g., replacing existing side screens with taller, shorter, or telescoping side screens); (9) removing, replacing, and/or reconfiguring one or more roof sheets of the autorack (e.g., to accommodate a new door structure, an increased autorack height); (10) removing, replacing, and/or reconfiguring an existing roof assembly (e.g., reconfiguring the roof assembly for a new door structure (such as a door structure with upper canopies) and/or increased autorack height, removing the roof assembly for re-coating, etc.); (11) adding, removing, and/or reconfiguring deck connection plates for application of decks at new and/or adjustable heights; (12) removing existing hinged deck support points (e.g., hinged deck support points 807 coupled to posts 2 and 3 below deck 808*b*); (13) installing a deck adjustment system to enable the height of one or more decks of an autorack to be adjusted; (14) installing a roof adjustment system to enable the height of the roof of an autorack to be adjusted (e.g., from 19' to approximately 20'2" and vice versa); (15) replacing and/or reconfiguring a side ladder assembly to accommodate an increased autorack height; (16) installing a magnetic door guard assembly; (17) any other suitable modification, replacement, or addition; and/or (18) any combination of the proceeding.

After performing step 1108 and/or any other suitable steps, the method may end.

Some of the steps illustrated in FIG. 11 may be combined, modified, or deleted where appropriate, and additional steps may also be added to the flowchart. Additionally, steps may be performed in any suitable order without departing from the scope of the disclosure. For example, the method may perform step 1104 before performing step 1102.

Teachings of the present disclosure may be satisfactorily used to reconfigure an autorack from a tri-level autorack into a bi-level autorack (and vice versa) and an autorack from a bi-level or tri-level autorack into a convertible autorack. Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although embodiments of the present disclosure and their advantages have been described in detail, it should be understood that various changes, substitutions and alternations can be made herein without departing from the spirit and scope of the present disclosure as defined by the following claims. Moreover, although particular embodiments have been described herein, a myriad of changes, variations, alterations, transformations, substitutions, and modifications may be suggested to one skilled in the art, and it is intended that the present disclosure encompass such changes, variations, alterations, transformations, substitutions, and modifications as fall within the scope of the appended claims. For example, although particular embodiments of the disclosure have been described with reference to a number of elements included in a system for reconfiguring an autorack, these elements may be combined, rearranged or positioned in order to accommodate particular storage requirements or needs. Various embodiments contemplate great flexibility in the system and method for reconfiguring an autorack and its components and steps. Additionally, while some embodiments are described with respect to an autorack, particular embodiments may be used for any type of transport.

The invention claimed is:

1. A method comprising:
   removing a first deck of a plurality of decks from an autorack, wherein the autorack is an existing autorack;
   increasing a width between a first post of a plurality of posts and a second post of the plurality of posts, the first post located near a first side of the autorack and the second post located near a second side of the autorack, the second side opposite the first side;
   coupling at least one pulley to the autorack;
   coupling at least one cable to the at least one pulley;
   coupling at least one actuator to the autorack;
   coupling a controller to the autorack, wherein the controller is electronically coupled to the at least one actuator; and
   coupling the first deck of the plurality of decks to the autorack and the at least one cable;
   wherein the at least one actuator is operable to pull the at least one cable to adjust a vertical position of the first deck within the autorack.

2. The method of claim 1, wherein the at least one pully is a first pulley, the at least one cable is a first cable, and the at least one actuator is a first actuator, and the method further comprising:
   removing a second deck of a plurality of decks from the autorack;
   coupling a second pulley to the autorack;
   coupling a second cable to the second pulley;
   coupling a second actuator to the autorack, wherein the controller is electronically coupled to the second actuator; and
   coupling the second deck of the plurality of decks to the autorack and the second cable;

wherein the second actuator is operable to pull the second cable to adjust a vertical position of the second deck within the autorack.

3. The method of claim 1, further comprising coupling a fastener to the first deck, wherein the fastener is configured to couple the first deck to the autorack at a desired vertical position.

4. The method of claim 1, further comprising:
coupling a cross-brace assembly to two or more of the plurality of posts of the autorack before the first deck of the plurality of decks is coupled to the autorack, the cross-brace assembly configured to support at least a portion of the first deck of the plurality of decks;
wherein:
the cross-brace assembly is coupled to the two or more of the plurality of posts at a location above an existing brace bay of the autorack; and
the first deck of the plurality of decks is coupled to the autorack at a location above or below the cross-brace assembly.

5. The method of claim 4, wherein coupling the cross-brace assembly to the two or more of the plurality of posts comprises:
coupling at least one brace of the cross-brace assembly to a third post of the plurality of posts; and
coupling the at least one brace of the cross-brace assembly to a fourth post of the plurality of posts.

6. The method of claim 4, wherein coupling the cross-brace assembly to the two or more of the plurality of posts comprises:
coupling a first bolting plate of the cross-brace assembly to a third post of the plurality of posts at a location above the existing brace bay of the autorack;
coupling a second bolting plate of the cross-brace assembly to the third post of the plurality of posts at a location above the first bolting plate;
coupling a third bolting plate of the cross-brace assembly to a fourth post of the plurality of posts at a location above the existing brace bay of the autorack; and
coupling a fourth bolting plate of the cross-brace assembly to the fourth post of the plurality of posts at a location above the third bolting plate.

7. The method of claim 6, further comprising:
coupling a first end of a first brace of the cross-brace assembly to the first bolting plate;
coupling a second end of the first brace to the fourth bolting plate;
coupling a first end of a second brace of the cross-brace assembly to the second bolting plate; and
coupling a second end of the second brace to the third bolting plate.

8. The method of claim 1, further comprising removing one or more of the plurality of posts from the autorack.

9. The method of claim 1, further comprising:
removing an existing door structure from the autorack; and
coupling a seal-safe radial door structure to at least one end of the autorack.

10. The method of claim 1, further comprising:
removing a roof section from the autorack;
increasing a height of one or more of the plurality of posts; and
coupling the roof section to the autorack.

* * * * *